(12) United States Patent
Anreddy et al.

(10) Patent No.: US 8,331,946 B2
(45) Date of Patent: Dec. 11, 2012

(54) METHODS AND APPARATUS FOR SUPPORTING MULTIPLE USERS IN A SYSTEM WITH MULTIPLE POLARIZED ANTENNAS

(75) Inventors: Vikram Reddy Anreddy, Bridgewater, NJ (US); Saurabh Tavildar, Jersey City, NJ (US); Juergen Cezanne, Ocean Township, NJ (US); Xinzhou Wu, Monmouth Junction, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1313 days.

(21) Appl. No.: 12/043,842

(22) Filed: Mar. 6, 2008

(65) Prior Publication Data
US 2009/0227260 A1    Sep. 10, 2009

(51) Int. Cl.
*H04W 72/00* (2009.01)
*H04W 4/00* (2009.01)

(52) U.S. Cl. .................................. 455/450; 370/330

(58) Field of Classification Search .................. 455/450, 455/562.1, 67.7, 522, 446; 370/319, 325, 370/330, 347, 350
See application file for complete search history.

(56) References Cited

U.S. PATENT DOCUMENTS

| 6,078,815 | A | 6/2000 | Edwards | |
|---|---|---|---|---|
| 6,519,478 | B1 * | 2/2003 | Scherzer et al. | 455/562.1 |
| 6,754,511 | B1 * | 6/2004 | Halford et al. | 455/562.1 |
| 2002/0159405 | A1 | 10/2002 | Garrison et al. | |
| 2002/0164954 | A1 * | 11/2002 | Jalali | 455/67.1 |
| 2002/0198026 | A1 * | 12/2002 | Niemela | 455/562 |

OTHER PUBLICATIONS

"International Search Report and Written Opinion—PCT/US2009/036429—ISA/EPO—Sep. 3, 2009".

* cited by examiner

*Primary Examiner* — Michael Faragalla
(74) *Attorney, Agent, or Firm* — Michelle Gallardo; Nicholas J. Pauley; Jonathan T. Velasco

(57) ABSTRACT

Methods and apparatus which support the use of differently polarized antennas to schedule two or more users employing multiple antennas with different polarization, on the same communications segment, e.g. a time/frequency slab, in either the uplink or downlink are described. Various embodiments include an access node which classifies and schedules wireless terminals to segments as a function of suitability for single polarization direction communications. Some embodiments are directed to methods and apparatus for operating a communications device supporting the use of multiple antennas having different polarization, to implement a polarization based multiple access scheme. Unlike Spatial Division multiple access schemes, the users sharing a communications segment in the polarization based scheme need not be geographically well separated. Another advantage of using the proposed method is that the communications system does not necessarily have to use a complex minimum mean square error receiver or implement successive iteration cancellation techniques, thereby reducing cost and system complexity.

41 Claims, 8 Drawing Sheets

METHODS AND APPARATUS FOR SUPPORTING MULTIPLE USERS IN A SYSTEM WITH MULTIPLE POLARIZED ANTENNAS

FIELD

Various embodiments relate to wireless communications systems, and more particularly to methods and apparatus for supporting multiple users in a system with multiple polarization antennas.

BACKGROUND

To boost the uplink capacity, the use of a Spatial Division Multi Access (SDMA) scheme has been found to be useful and is well known as an uplink Multiple Input Multiple Output (MIMO) technique. In such a scheme, the key feature is to schedule more than one user device implementing MIMO functionality on the same communication segment, e.g. a time/frequency slab. The data/information signals from these users can then be separated out at the receiver using standard techniques as Minimum Mean Square error (MMSE) or Successive Interference Cancellation (SIC) techniques. Although the boost in uplink capacity is promising with the application of the above mentioned scheme, various problems exist with such an implementation including higher cost and increased system complexity. Moreover, the performance of such a scheme relies heavily on the difference between the spatial signatures of the users scheduled on the same communication segment. If the users sharing the communications segment, e.g. sharing the same time/frequency slab, happen to have similar spatial signatures, i.e. if the users are not geographically/physically well separated from each other, then transmissions from these users are degraded or unrecoverable due to excessive interference. To address this problem, a complex and more intelligent scheduler might be required to schedule only the users with significantly different spatial signatures, on the same communications segment.

In view of the above discussion, it would be desirable if improved methods and apparatus could be developed to boost the uplink capacity by scheduling more than one user on a single communications segment. It would be beneficial if such improved methods and apparatus were able to boost capacity without adding significant extra complexity to the system.

SUMMARY

Methods and apparatus for operating a communications device for supporting the use of multiple antennas having different polarization to implement a polarization based multi access scheme are described.

A polarization based multi access scheme is used to boost the spectral efficiency of a communications system. The polarization based multi access scheme employs a strategy, whereby information signals from different users are scheduled on a single communication segment such as a time/frequency slab. The proposed scheme exploits the use of multiple antennas with different polarizations to schedule more than one user on a single communications segment. The users sending the information signals use different polarization antennas so that the information signals are being carried on differently polarized waves. An advantage of such a scheme is that one does not need to care about spatial signatures of the users sharing the communications segment. Even if the users happen to be located geographically close to each other, the proposed method allows the users to share a single communications segment to transmit information signals using differently polarized antennas.

In one exemplary embodiment, an access node, e.g. a base station, employing a vertically polarized antenna and a horizontally polarized antenna is used in implementing a polarization based multi access scheme. The exemplary base station schedules, at times, two users on the same communications segment, e.g. time/frequency slab, and schedules them to use different polarization antennas to transmit their information signals. In some embodiments, the base station separates wireless terminals into two categories as a function of measured pilots, e.g., measured uplink pilots. One of the categories would include wireless terminals deemed to be substantially vertically positioned wireless terminals and the other category would include the other wireless terminals, e.g., tilted wireless terminals. The scheduler can, and sometimes does, schedule two wireless terminals in the first category to use the same segment, wherein a first wireless terminal is scheduled to use a vertical polarization antenna and a second wireless terminal is scheduled to use a horizontal polarization antenna. However, if a wireless terminal is classified to be in the second category, the scheduler schedules such a wireless terminal on a segment without scheduling any other wireless terminals to the same segment. Another advantage of using such a polarization based scheme is that the communications system does not necessarily need to have to use a complex MMSE receiver or implement SIC techniques, thereby reducing cost and system complexity over other approaches. In some embodiments, a communications device, e.g. a wireless terminal, employing a vertically polarized antenna and a horizontally polarized antenna uses a single radio frequency (RF) chain e.g. a single receiver and transmitter chain to transmit information to and/or receive information from a base station.

An exemplary method of operating an access node, e.g., base station, in accordance with various embodiments, comprises: storing information indicating assignment of a first set of wireless terminals to a first polarized antenna mode of operation; storing information indicating assignment of a second set of wireless terminals to a second polarized antenna mode of operation which is different from the first polarized antenna mode of operation; and signaling to a wireless terminal, the mode of polarized antenna operation to be used. An exemplary access node, e.g., base station, in accordance with various embodiments comprises: memory including information indicating assignment of a first set of wireless terminals to a first polarized antenna mode of operation and assignment of a second set of wireless terminals to a second polarized antenna mode of operation which is different from the first polarized antenna mode of operation; and a transmitter module for signaling to a wireless terminal, the mode of polarized antenna operation to be used.

An exemplary method of operating a wireless terminal, in accordance with some embodiments, comprises: receiving a signal from an access node indicating an assigned mode of polarized antenna operation to be used when communicating with said access node, configuring the wireless terminal to said assigned mode of polarized operation, and transmitting a signal to said access node while configured in said assigned mode of polarized operation. An exemplary wireless terminal, in accordance with some embodiments, comprises: a receiver for receiving a mode indicator signal from an access node indicating an assigned mode of polarized antenna operation to be used when communicating with said access node; a first antenna being polarized in a first direction; a second antenna being polarized in a second direction, said second direction being different from said first direction; a first control module for configuring the wireless terminal to use said antennas in accordance with said assigned mode of polarized operation; and a transmitter transmitting a signal to said access node while configured in aid assigned mode of polarized operation.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION OF THE FIGURES

Figure 1:
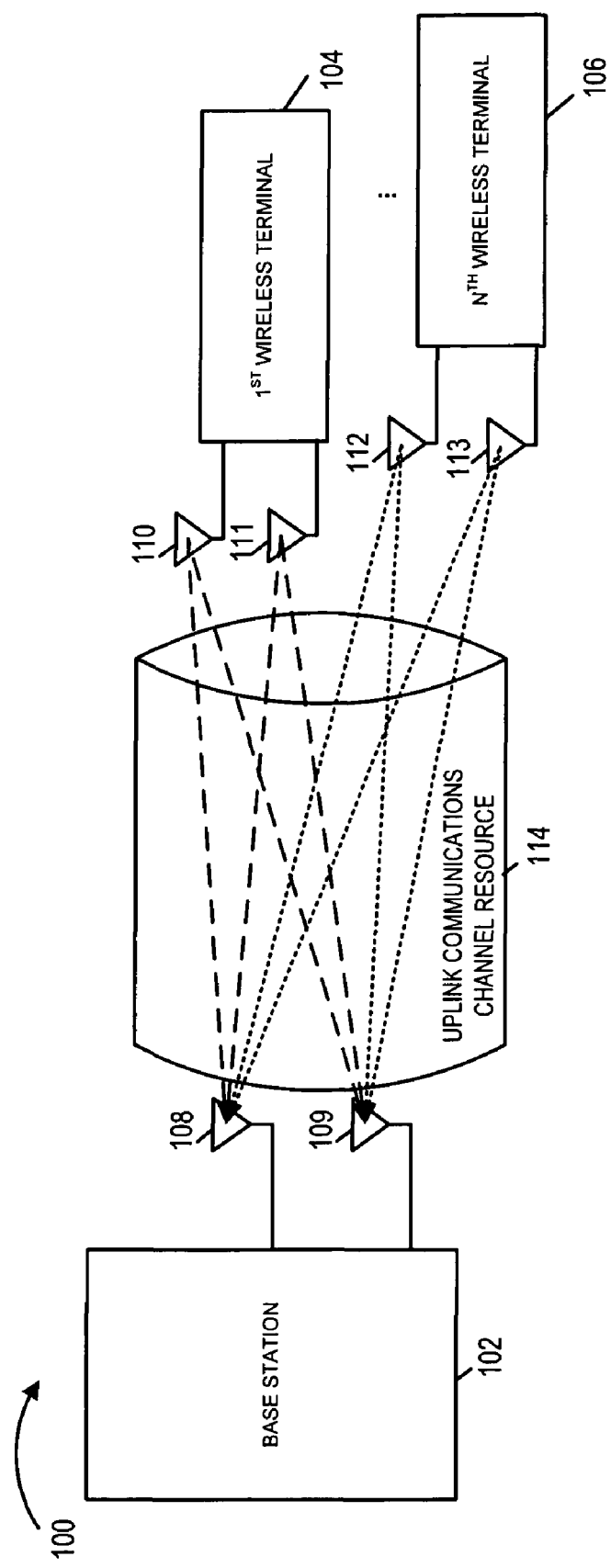
FIG. 1 illustrates a known communications system.

FIG. 1 illustrates a known communication system 100 including a base station 102 and a plurality of wireless terminals ($1^{ST}$ wireless terminal 104, . . . , Nth wireless terminal 106). There is an uplink communications channel resource 114, e.g., a time/frequency slab, existing to convey signals between one or more of the wireless terminals (104, . . . , 106) and the base station 102. The wireless terminals (104, 106) each include a transmitter, and the base station 102 includes a receiver. Wireless terminal 104, which includes a transmitter, can transmit uplink signals via antennas (110, 111) using uplink channel resource 114 to base station 102 which can receive the signals via antennas (108, 109) and attempt to the recover the information being communicated from WT 104. Similarly, wireless terminal 106, which includes a transmitter, can transmit uplink signals via antennas (112, 113) using the same uplink channel resource 114 to base station 102 which can receive the signals via antenna (108, 109) and attempt to the recover the information being communicated from WT 106. In this exemplary system, the base station 102 includes two antennas, e.g., a two vertically polarized antenna which are separated. In the communications system 100 if two wireless terminals have communications channel signatures which indicate that they are sufficiently spatially separated such that they can concurrently use uplink communications channel resource 114 to communicate with base station 102, the two wireless terminals can be scheduled to use the same uplink communications channel resource 114 concurrently. However, if in the communications system 100, two wireless terminals under consideration for the resource are not deemed to be sufficiently spatially separated, then a single one of the wireless terminal is scheduled to use the communication channel resource 114 at a time. For example, if two wireless terminals (104, 106) under consideration happen to be geographically close to each other, then, either the $1^{st}$ wireless terminal 104 or $N^{th}$ wireless terminal 106, can use the communications channel resource 114 at a given time, but not both, due to strong interference which would result if they both try to use the same air link resource concurrently. Thus the wireless terminal not scheduled to use communications channel resource 114 would need to remain idle or would need to be scheduled on another communications channel resource. Also to be able support sharing of the communication resource 114 in an efficient manner by two wireless terminals which transmitting concurrently, a complex scheduler is required to select which, if any, two wireless terminals from the set of N wireless terminals can be concurrently scheduled, e.g., based on channel signature information.

Figure 2:
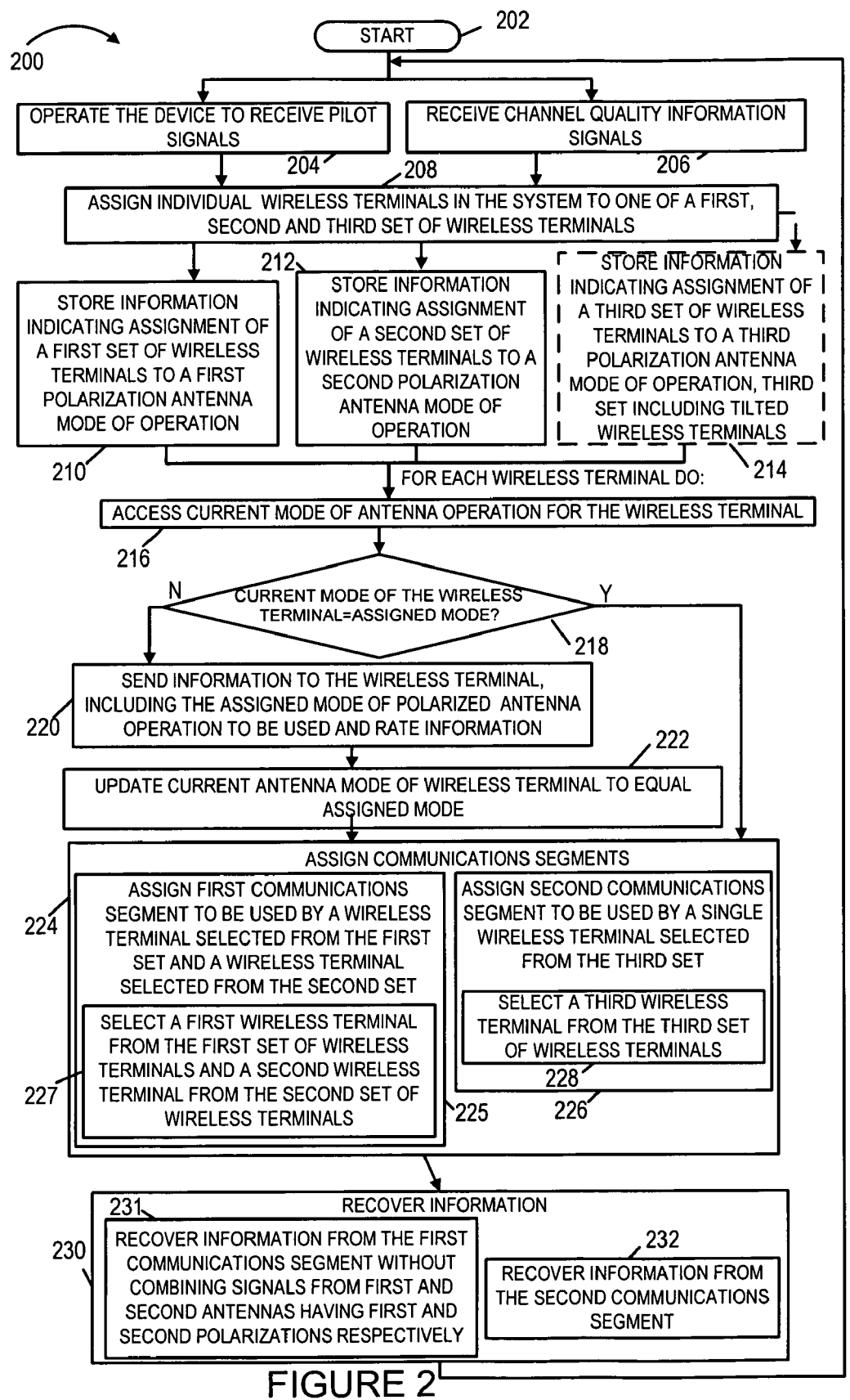
FIG. 2 illustrates a flowchart showing the steps of an exemplary method to operate an access node in accordance with an embodiment.
Figure 3:
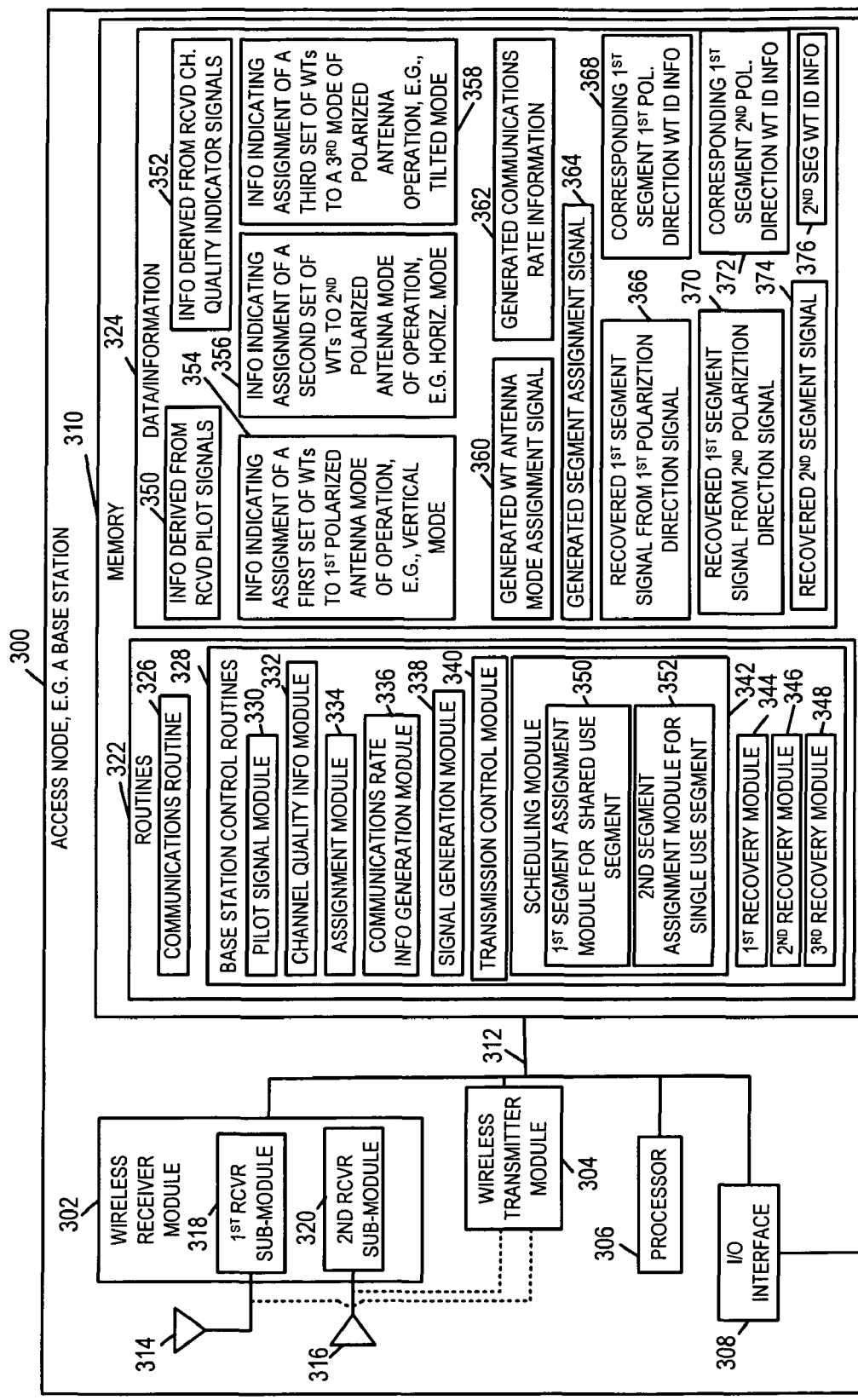
FIG. 3 illustrates an exemplary access node in accordance with an embodiment.

FIG. 2 illustrates a flowchart 200 showing the steps of an exemplary method to operate an access node, e.g. a base station, such as access node 300 of FIG. 3, in accordance with an embodiment. The exemplary base station includes a vertical polarization antenna and a horizontal polarization antenna. The exemplary method starts in step 202, where initialization is performed, and proceeds from start step 202 to step 204, for some embodiments, e.g., some frequency division duplexing (FDD) embodiments in which different frequency bands are used for the uplink and downlink signaling. In some embodiments, e.g. some time division duplexing (TDD) embodiments in which the same frequency band is used for uplink and downlink signaling for communication between an access node and a wireless terminal, the operation may proceed from step 202 to 206. In some embodiments, both steps 204 and 206 are performed. In step 204, the access node, e.g. access node 300 of FIG. 3 is operated to receive pilot signals from other devices, e.g. wireless terminals. In some embodiments, the access node uses the received pilot signals to estimate the quality of the communication channel. The operation proceeds from step 204 to step 208. Returning to step 206, in step 206, the access node is operated to receive channel quality information signals from other devices, e.g. wireless terminals. The channel quality information may include, e.g., information such as SNRs, interference level information, etc. The channel quality information is, e.g., feedback information based on downlink pilot signals transmitted previously from the base station to the wireless terminals. The operation proceeds from step 206 to 208.

In step 208, individual wireless terminals in the system are assigned to one of a first, second and third set of wireless terminals. The assignment of a wireless terminal to be associated with a set of wireless terminals corresponding to a polarized mode of antenna operation is based on a signal received from the wireless terminal, e.g., a pilot signal received from the wireless terminals in step 204 or channel quality information received from the wireless terminal in step 206. This assignment of individual wireless terminals into three different sets is done to classify these wireless terminals into groups of similar type of wireless terminals. The first set is, e.g., a set of wireless terminals which may use vertically polarized antennas for communication with the base station while other wireless terminals use horizontally polarized antennas for communication with the base station using the same communications segment concurrently. The second set of wireless terminals is, e.g., a set of wireless terminals which may use horizontally polarized antennas for communication with the base station while other wireless terminals use vertically polarized antennas for communication with the base station using the same segment concurrently. The third set of wireless terminals is, e.g., a set of wireless terminals which are not candidates for using a single direction polarization antenna for communications while another wireless terminal uses a different direction polarization antenna to concurrently communicate on the same communications segment. The different directions are, e.g., orthogonal directions corresponding to different direction polarization antennas, such as a vertical polarization direction antenna and a horizontal polarization direction antenna. In some embodiments, the first and second sets include wireless terminals deemed to be substantially vertical and the third set of wireless terminals includes wireless terminals deemed to be tilted wireless terminals.

In some embodiments, wireless terminals are initially grouped into either (i) a set of wireless terminals which are candidates for operation using a single direction polarization antenna or (ii) a set of wireless terminals which are not candidates for using a single direction polarization antenna without concurrent use of an antenna with a different polarization. In some such embodiments, the assignment to horizontal or vertical polarization, for a wireless terminal suited for single direction polarization operation, is performed on the fly. For example, in some embodiments, at the time of segment scheduling, e.g., traffic channel segment scheduling, a particular wireless terminal is assigned for the segment being scheduled to a particular antenna polarization. For example, a wireless terminal in the set of candidates for using a single direction polarization may be assigned to use vertical polarization or alternatively assigned to use horizontal polarization for a particular segment. Over time the assignments may vary with the wireless terminal being switched between horizontal and vertical polarizations.

The operation proceeds from step 208 to step 210 and step 212 which may be performed in parallel or sequentially depending upon the embodiment. In some, but not necessarily all embodiments, the operation may proceed from step 208 to 214 as well in addition to step 210 and 212.

In step 210, the access node is operated to store information indicating assignment of a first set of wireless terminals to a first polarization antenna mode of operation. The information may be stored by the access node in its memory, e.g. as information 354 in memory 310 as shown in FIG. 3. In step 212, the access node is operated to store information indicating assignment of a second set of wireless terminals to a second polarization antenna mode of operation. In some embodiments, the first polarization mode is vertical polarization mode of antenna operation and second polarization mode is horizontal polarization mode of antenna operation. In step 214, the access node is operated to store information indicating assignment of a third set of wireless terminals to a third polarization antenna mode of operation, e.g., a tilted mode of antenna polarization operation. The third set of wireless terminals include wireless terminals which are relatively tilted. In some embodiments, when operating in a tilted mode, the wireless terminal transmits the same information on both its vertical and horizontal antennas but with a 90 degree phase shift between the information signals supplied to the antennas. The operation proceeds from steps 210, 212 and 214 to step 216.

Steps 216, 218 220 and 222 are performed for each wireless terminal under consideration by the base station. In step 216, memory is accessed to determine the current mode of antenna operation for the wireless terminal. The operation proceeds from step 216 to step 218. Step 218 is a decision step, and in this step, it is determined whether the current mode of antenna operation of the wireless terminal under consideration is same as the assigned mode of antenna operation. If it is determined that the current mode of antenna operation of the wireless terminal is same as the assigned mode, the operation then proceeds to step 224 If it is determined that the current mode of antenna operation of the wireless terminal is different from the assigned mode, the operation proceeds to step 220.

In step 220, a signal is sent to the wireless terminal indicating the assigned mode of polarized antenna operation and communication rate information to be used by the wireless terminal. The mode of polarized operation to be used, which is signaled in step 220 is, in some embodiments, an uplink mode of polarized antenna operation to be used for transmitting signals to the access terminal. In some embodiments, a wireless terminal may, and sometimes does, operate in different modes of polarized operation with regard to the downlink and uplink. In some embodiments, the assigned mode of polarized operation may be independent for the uplink and the downlink. In some embodiments, the signaling being performed in step 220 uses an antenna corresponding to the downlink mode of polarized operation in which the wireless terminal is operating to communicate the selected uplink mode of polarized operation for the wireless terminal. In some embodiments, the assigned downlink polarized mode is used for communicating traffic signals in the downlink.

The operation proceeds from step 220 to step 222. In step 222, the current mode of antenna operation for the wireless terminal is updated to be the assigned mode of antenna operation. It should be noted that steps 216 through 222 are performed repeatedly for each wireless terminal in the system which intends to communicate, until each of the wireless terminals are processed and the current antenna mode of operation is updated, if an update is needed. The operation proceeds from step 222 to step 224.

In step 224, the assignment of a first and second communications segment is performed. Step 224 includes sub-steps 225 and 226. In sub-step 225, the base station assigns a first communications segment to be used by a wireless terminal selected from the first set and a wireless terminal selected from the second set. This is effectively, the scheduling of two users on the same communication resource. Step 225 includes sub-step 227. In sub step 227, the base station selects a first wireless terminal from the first set of wireless terminals and a second wireless terminal from the second set of wireless terminals. In sub-step 228, the base station assigns a second communications segment also a single wireless terminal selected from the third set of wireless terminals. Sub-step 226 includes sub-step 228. In sub-step 228, the third wireless terminal is selected from the third set of wireless terminals including relatively tilted wireless terminals. Step 224 also includes generating assignment signals and transmitting the assignment information to the wireless terminals. The number and/or relative amounts of assignments performed in sub-steps 225 and 226 may vary and may occur at different times.

In some embodiments, the first and second communications segments correspond to time intervals which at least partially overlap. In some such embodiments, the first and second communications segments correspond to the same time. In various embodiments, the first and second communications segments are uplink traffic channel segments.

The operation proceeds from step 224 to step 230. In step 230, the base station recovers data and/or information from the different communications segments. The first communications segment as discussed in above steps, serves to carry data and/or information from two different users, e.g. a user of first wireless terminal and a user of second wireless terminal. Step 230 further includes sub-steps 231 and 232. In sub-step 231, data and/or information is recovered from the first communications segment without combining signals from first and second antennas which have polarization in the first and second directions respectively. This highlights a very significant feature of the proposed method. The information recovery is being performed without the use of a sophisticated receiver, e.g. a minimum mean square error (MMSE) receiver or a Successive Interference Cancellation (SIC) technique receiver. This recovery is possible due to the fact that the data/information on the first communication segment has been transmitted by wireless terminals which have different antenna polarization modes of operation. In sub-step 232, information is recovered from the second communications segment which contains data/information sent by a single wireless terminal from the third set of wireless terminals.

Following step 230, the operation moves back to steps 204 and/or 206, and the process may be repeated and the steps may be performed on an ongoing basis.

FIG. 3 is a drawing of an exemplary access node 300, e.g., base station, in accordance with an exemplary embodiment. Exemplary access node 300 includes a wireless receiver module 302, a wireless transmitter module 304, a processor 306, an I/O interface 308, and a memory 310 coupled together via a bus 312 over which the various elements may interchange data and information.

Memory 310 includes routines 322 and data/information 324. The processor 306, e.g., a CPU, executes the routines 322 and uses the data/information 324 in memory 310 to control the operation of the access node 300 and implement methods, e.g., the method of flowchart 200 of FIG. 2.

Receiver module 302 includes $1^{st}$ receiver sub-module 318 coupled to first polarization direction antenna 314 and $2^{nd}$ receiver sub-module 320 coupled to second polarization direction antenna 316. The first direction is different from the second direction. For example, the first direction is a vertical polarization direction and the second direction is a horizontal polarization direction.

Wireless transmitter module 304 is also coupled to first and second polarization direction antenna (314, 316), in this exemplary embodiment. In some embodiments, different antennas are used for the transmitter module 304 and the receiver module 302. Transmitter module 304 transmits downlink signals to wireless terminals, the transmitted signals include a signal to a wireless terminal indicating the mode of polarized antenna operation to be used by the wireless terminal, e.g., generated wireless terminal antenna mode assignment signal 360.

I/O interface 308 couples the access node 300 to other network nodes, e.g., other access nodes, routers, AAA nodes, home agent nodes, system control nodes, and/or the Internet. I/O interface 308, by coupling the access node 300 to a backhaul network, allows a wireless terminal using an attachment point of access node 300 to communicate with a peer wireless terminal using an attachment point of another access node.

Routines 322 include a communications routine 326 and base station control routines 328. The communications routine 326 implements the various communications protocols used by the access node 300. The base station control routines 328 include a pilot signal module 330, a channel quality estimation module 332, an assignment module 334, a communications rate information generation module 336, a signal generation module 338, a transmission control module 340, a scheduling module 342, a first recovery module 344, a second recovery module 346, and a third recovery module 348. Scheduling module 342 includes a first segment assignment module for shared use segments 350 and a second segment assignment module for single use segments 352.

Data/information 324 includes information derived from received pilot signals 350, information derived from received channel quality indicator signals 352, information indicating assignment of a first set of wireless terminal to a first polarized mode of antenna operation 354, information indicating assignment of a second set of wireless terminals to a $2^{nd}$ polarized antenna mode of operation 356, information indicating assignment of a third set of wireless terminals to a third mode of polarized antenna operation 358, a generated wireless terminal antenna mode assignment signal 360, generated communications rate information 362, a generated segment assignment signal 364, a recovered first segment signal from a received $1^{st}$ polarization direction signal 366 and corresponding first segment $1^{st}$ polarization direction wireless terminal identification information 368, a recovered first segment signal from a received $2^{nd}$ polarization direction signal 370 and corresponding $1^{st}$ segment second polarization direction wireless terminal identification information 372, and a recovered second segment signal 374 and corresponding second segment wireless terminal identification information 376.

Assignment module 334 assigns wireless terminals to operate in one of a plurality of different polarized antenna modes of operation. For example, a first polarized mode of antenna operation is a vertical polarization mode of antenna operation; a second polarized mode of antenna operation is a horizontal polarization mode of antenna operation, and a third polarized mode of antenna operation is a tilted wireless terminal mode of operation in which both horizontal and vertical polarization antennas are used. In some embodiments, the mode of polarized antenna operation which is assigned which is to be used by the wireless terminal is an uplink mode of polarized antenna operation to be used for transmitting signals to the access node 300. The assignment module 334 assigns for an individual one of the wireless terminals based on a signal received from said individual one of the wireless terminals, the received signal being one of: i) a pilot signal, e.g., an uplink pilot signal, and ii) a channel quality information signal, e.g., a signal conveying SNR information, SIR information, and/or communications channel rank information.

Pilot signal module 330 processes received uplink pilot signals from wireless terminals obtaining wireless terminal channel characterization information derived from pilot signals 350 which is utilized as an input to assignment module 334. Channel quality information module 332 processes received channel quality indicator signals, e.g., SNRs, SIRs, and/or rank information, from wireless terminals, obtaining channel characterization information derived from received channel quality indicator signals 352 which is utilized as input to assignment module 334.

Communications rate information generation module 336 generates communications rate information relating to communications between a wireless terminal and the access node, e.g., generated communications rate information 362. Generated communications rate information 362 includes, e.g., a maximum information data rate, power level information, information identifying a coding rate, and/or information identifying a modulation constellation. For example, the communications rate information generation module 338 generates rate information corresponding to the antenna mode polarization scheme assigned to be used by the wireless terminal, measured channel conditions and taking into consideration interference management. In some embodiments, signal generation module 338 generates a rate information signal to be transmitted to a wireless terminal in addition to generating a signal conveying the mode of polarized antenna operation to be used by the wireless terminal 360. In other embodiments, the signal generation module 338 generates a wireless terminal antenna mode assignment signal which conveys both a mode assignment and rate information.

In some embodiments the rate information is communicated in a message along with a segment assignment. In some embodiments, the antenna mode assignment information is communicated in a message along with the segment assignment. In some such embodiments, such a message also includes data rate information.

In various embodiments, a wireless terminal can, and sometimes does, operate in a downlink mode of polarized operation which is different from its uplink mode of polarized operation which is signaled from the access node 300. The transmission control module 340 controls transmission using one or more of said first and second antennas (314, 316), the antenna or antennas being used for signaling the uplink mode of polarized antenna operation to be used, corresponding to the downlink mode of polarized antenna operation in which the wireless terminal is operating. For example, if the wireless terminal is operating in a downlink vertical polarized mode of operation, the transmission control module 340 controls the wireless transmitter module 304 to transmit the uplink polarized mode of operation assignment signal using vertical polarization antenna 314. Alternatively, if the wireless terminal is operating in a downlink horizontal polarized mode of operation, the transmission control module 340 controls the wireless transmitter module 304 to transmit the uplink polarized mode of operation assignment signal using horizontal polarization antenna 316. Alternatively, if the wireless terminal is operating in a downlink dual polarized mode of operation, the transmission control module 340 controls the wireless transmitter module to transmit the uplink polarized mode of operation assignment signal using both vertically polarized antenna 314 and horizontal polarized antenna 316. In some embodiments, the wireless transmitter module 304 signals an uplink polarized mode of operation assignment signal using both antennas 314 and 316 irrespective of the mode of operation of the wireless terminal.

Scheduling module 342 schedules wireless terminals to uplink segments, e.g., uplink traffic channel segments. If a segment is to be assigned to: (i) a user assigned to use a first direction, e.g., vertical direction, polarization antenna mode of operation and (ii) to a user assigned to use a second direction, e.g., horizontal direction, polarization antenna mode of operation, for concurrent uplink signaling, then $1^{st}$ segment assignment module for shared use segment 350 performs the segment assignments. The assignment of module 350 includes selecting one wireless terminal from the set of wireless terminal identified by information 354 and selecting a second wireless terminal from the set of wireless terminals identified by information 356, for the segment. If a segment is to be assigned to a single user which should not be concurrently scheduled with another user, then $2^{nd}$ segment assignment module for single use segment 352 performs the segment assignment. The assignment of module 352 includes selecting one wireless terminal from the set of wireless terminal identified by information 358, e.g., a set of wireless terminals being wireless terminals operating in a tilted mode of antenna polarization operation.

In various embodiments, a first segment assigned by module 350 and a second segment assigned by module 352 correspond to the same time. For example, in an OFDM system, the first segment may correspond to a first set of uplink tones during a first time interval and the second segment may correspond to a second set of uplink tones during the first time interval, wherein the first and second sets of tones are non-overlapping.

First recovery module 344 recovers uplink signals from a wireless terminal operating in a first polarized antenna mode of operation, e.g., signals received via antenna 314 and first receiver sub-module 318 wherein the wireless terminal which transmitted the uplink signals was a wireless terminal identified by information 354. Second recovery module 346 recovers uplink signals form a wireless terminal operating in a second polarized mode of antenna operation, e.g., signals received via antenna 316 and second receiver sub-module 320 wherein the wireless terminal which transmitted the uplink signals was a wireless terminal identified by information 356. Third recovery module 348 recovers uplink signals from a wireless terminal operating in a third polarized antenna mode of operation, e.g., signals received via antenna 314 and first receiver sub-module 318 and signal received via antenna 316 and receiver sub-module 320 wherein the wireless terminal which transmitted the uplink signals was a wireless terminal identified by information 358. In various embodiments, the third recovery module 348 includes a combining module.

Information indicating assignment of a first set of wireless terminals to a first polarized mode of operation is a result of assignment module's 334 classification of wireless terminals with regard to uplink signaling mode of antenna operation to belong to a set which is to use first direction polarization, e.g., vertical antenna polarization for uplink signaling. Information indicating assignment of a second set of wireless terminals to a second polarized mode of operation is a result of assignment module's 334 classification of wireless terminals with regard to uplink signaling mode of antenna operation to belong to a set which is to use second direction polarization, e.g., horizontal antenna polarization for uplink signaling.

The base station 300, at times, schedules more than one user on a single communications segment, e.g. a first communications segment as discussed in step 225 of the exemplary flowchart 200, and schedules them to use different polarization antennas. To perform the above said function, the base station 300, in some embodiments, keeps track of the channel qualities on both polarization channels from each user. In some embodiments where a Time division Duplexing (TDD) scheme is deployed, this is achieved by letting the wireless terminals feed back the downlink channel quality, i.e. the base station 300 may send out downlink pilot signals on both polarization antennas, e.g. antennas 314 and 316, and each wireless terminal then measures the channel quality on both polarization antennas and reports them back to the base station 300 by sending a channel quality information signal, which is received and processed by channel quality information module 332.

In some other embodiments where a Frequency Division Duplexing (FDD) scheme has been implemented and where uplink and downlink channel qualities are not symmetric, uplink pilots on both polarizations are used for the base station to track the channel qualities on both polarization directions. Pilot signal module 330 is used to receive and process uplink pilot signals. En some embodiments, the base station 300, then makes a scheduling decision based on the channel qualities on both channels for the wireless terminals in the system, the user traffic condition information, e.g. as in stored information, and/or Quality of Service (QoS) requirements for the wireless terminals sharing the communications segment. In order to achieve multi-user diversity, the wireless terminals with better channel quality on the two polarization channels may be chosen by the base station to share a current communications segment, e.g. a current time frequency slab. The base station 300 then notifies the user of its decision about the assigned mode of antenna operation and their transmission rate. Thus in the control channel, in addition to the user ID and rate option, an additional bit is needed to let the wireless terminal know which polarization antenna to use in the scheduled transmission, in the case where two different direction polarizations are used.

In some embodiments, some traffic segments in a recurring timing/frequency may be allocated to carry first type segments in which two wireless terminals using different polarizations can be assigned the same segment, while some other segments in the recurring timing/frequency structure are reserved to be allocated to a single wireless terminal which is to use both direction polarization antennas concurrently. The traffic channel assignment structure can be, and sometimes is, implemented, in a predetermined manner, with corresponding assignment slots. In some embodiments, the segments, e.g., uplink traffic channel segments can be flexibility assigned, as needed, to a single device using both polarization direction antennas or to two different devices, each using a single different polarization direction antenna, e.g., with a field, e.g., a bit or bits, in the assignment signal for the segment being allocated to be used to clarify the assignment, e.g., in terms of the polarization mode of operation to be used by the wireless terminal to which the segment is assigned.

Figure 4:
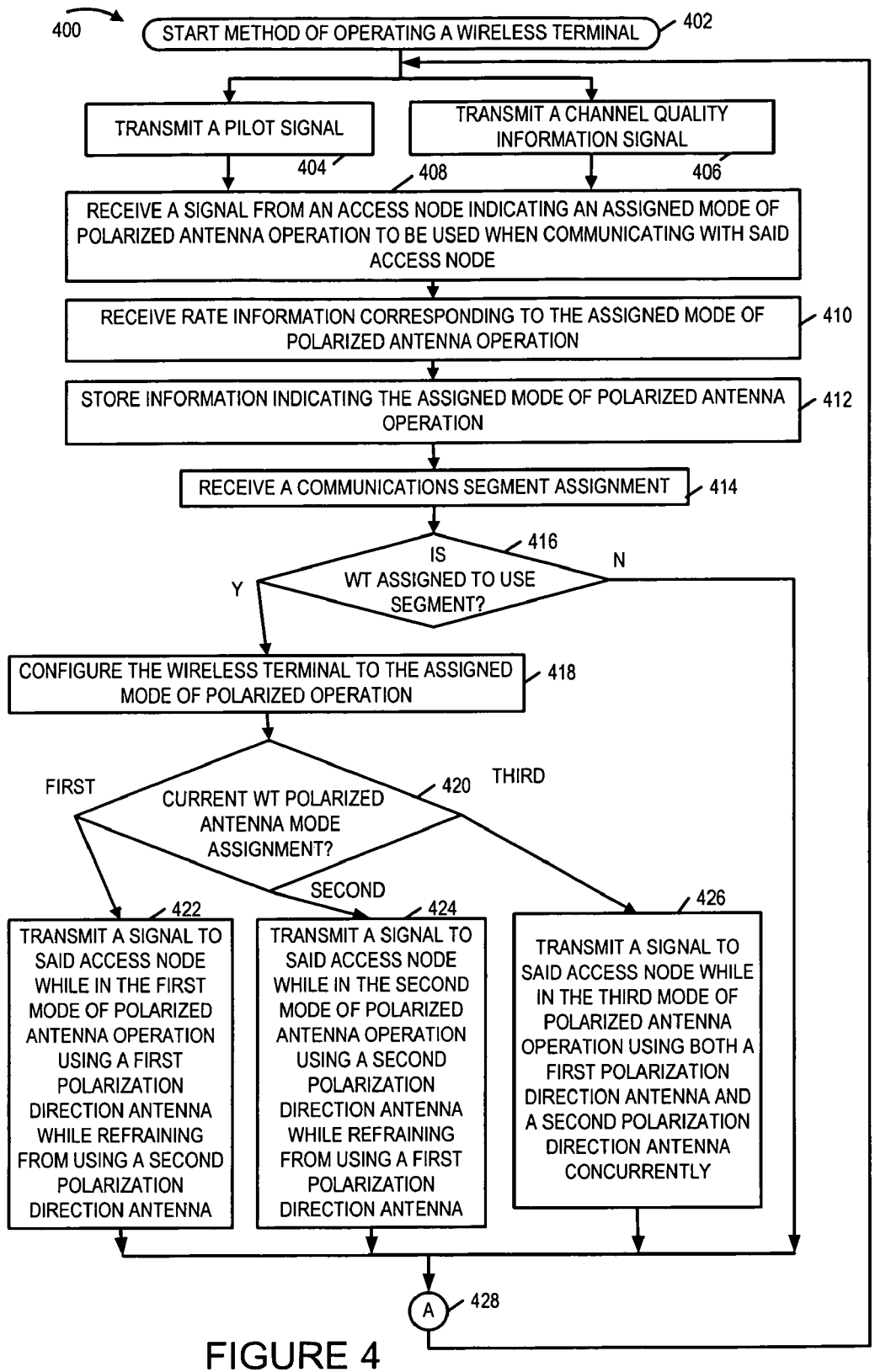
FIG. 4 illustrates an exemplary method of operating a wireless terminal in accordance with various embodiments.

FIG. 4 is a flowchart 400 of an exemplary method of operating a wireless terminal, e.g., mobile node, in accordance with various embodiments. The exemplary wireless terminal includes first and second polarization antennas, e.g., a first antenna designated a vertical polarization direction antenna and a second antenna designated a horizontal polarization antenna. Operation of the exemplary method starts in step 402 where the wireless terminal is powered on and initialized and proceeds to one or more of steps 404 and 406. In step 404 the wireless terminal transmits a pilot signal to an access node, e.g., an uplink pilot signal. In some embodiments, the wireless terminal transmits one or more pilot signals on a first polarization direction antenna and transmits one or more pilot signals on a second polarization direction antenna to the access node. In step 406 the wireless terminal transmits a channel quality information signal to the access node, e.g., a signal conveying SNR information, SIR information, communications channel matrix rank information, etc., based on received downlink signals from the access node.

In some FDD embodiments, it is advantageous to use uplink pilot signals to provide the access node with information upon which to base an uplink signaling mode of polarized antenna operation for the wireless terminal, and thus step 404 is performed. In some TDD embodiments, it is adequate for the access node to use feedback information generated from downlink pilots transmitted by the access node, received and measured by the wireless terminals, and the feedback information communicated to the access node, to determine an uplink signaling mode of polarized antenna operation for the wireless terminal and thus step 406 is performed.

Operation proceeds from one or more of steps 404 and 406 to step 408. In step 408 the wireless terminal receives a signal from the access node indicating an assigned mode of polarized antenna operation to be used when communicating with the access node. In some embodiments, the assigned mode of polarized antenna operation is one of: i) a first mode which is a vertical polarization direction mode and ii) a second mode which is a horizontal polarization direction mode. In various embodiments, the assigned mode of polarized antenna operation is from a set of assigned modes including a first mode which is a vertical polarization direction mode, a second mode which is a horizontal polarization direction mode and a third mode which is a tilted mode of polarization operation. In some embodiments, the assigned mode of polarized antenna operation is an uplink mode of polarized antenna operation to be used for transmitting signals to the access node, e.g., an uplink vertical polarization direction mode, an uplink horizontal polarization direction mode, or an uplink tilted polarization direction mode to be used for transmitting uplink signals including uplink traffic channel segment signals to the access node. In various embodiments, the wireless terminal can, and sometimes does, operate in a downlink mode of polarized operation which is different from the uplink mode of polarized antenna operation being signaled in step 408, the receiving of step 408 being performed using an antenna corresponding to the downlink mode of polarized antenna operation in which the wireless terminal is operating.

In step 410 the wireless terminal receives rate information corresponding to the assigned mode of polarized antenna operation. In some embodiments, rate information is communicated in a segment assignment signal. In some embodiments, the received signal conveying the assigned mode of polarized antenna operation also conveys the rate information. Operation proceeds from step 410 to step 412, in which the wireless terminal stores information indicating the assigned mode of polarized antenna operation.

Operation proceeds from step 412 to step 414 in which the wireless terminal receives a communications segment assignment. The communications segment assignment can be, and sometimes is, an assignment for a segment to be used by two wireless terminals at the same time but with the two wireless terminals using different antenna polarizations. For example, the assignment can convey an assignment indicating the wireless terminal performing the method of flowchart 400, which happens to be currently assigned to one of the first and second modes of polarized antenna operation, is one of the two wireless terminals assigned to such a segment. Alternatively, the assignment can be, and sometimes is an assignment for a segment to be used by a single wireless terminal. For example, the assignment can convey an assignment indicating that the wireless terminal performing the method of flowchart 400, which happens to be currently assigned to the third mode, e.g., tilted mode, of polarized antenna operation, is assigned to use the segment without any other wireless terminal being assigned to use the same segment concurrently. In various embodiments, the communications segment being assigned is an uplink traffic channel segment.

Then, in step 416 the wireless terminal determines whether or not it is assigned to use the segment. If it is assigned to use the communications segment, then operation proceeds from step 416 to step 418; otherwise operation proceeds from step 416 to connecting node A 428.

Returning to step 418, in step 418 the wireless terminal configures the wireless terminal to the assigned mode of polarized operation communicated in step 408. Operation proceeds from step 418 to step 420. In step 420 operation proceeds to different steps as a function of the current wireless polarized antenna mode assignment. If the wireless terminal's current mode is a first mode, e.g., a vertical direction polarization mode, then operation proceeds from step 420 to step 422. In step 422 the wireless terminal transmits a signal to the access node while in the first polarized mode of antenna operation using a first polarization direction antenna while refraining from using a second polarization direction antenna. Alternatively, if the wireless terminal's current mode is a second mode, e.g., a horizontal direction polarization mode, then operation proceeds from step 420 to step 424. In step 424 the wireless terminal transmits a signal to the access node while in the second polarized mode of antenna operation using a second polarization direction antenna while refraining from using a first polarization direction antenna. The second polarization direction antenna corresponds to a polarization direction which is substantially 90 degrees offset from the polarization direction of the second polarization direction antenna. Alternatively, if the wireless terminal's current mode is a third mode, e.g., a tilted mode, then operation proceeds from step 420 to step 426. In step 426 the wireless terminal transmits a signal to the access node while in the third polarized mode of antenna operation using both a first polarization direction antenna and a second polarization direction antenna concurrently. Operation proceeds from steps 422, 424 and 426 to connecting node A 428.

Operation proceeds from connecting node A 428 to step 404 and/or 406, where the wireless terminal transmits signals to the base station to be used to make another determination as to the assigned mode of polarized antenna operation for the wireless terminal. As an example, in a first iteration, the wireless terminal may be assigned to a first, e.g., vertical, mode of polarized antenna operation, be subsequently assigned to a first uplink traffic channel segment, and transmit uplink traffic channel segment signals using a first, e.g., vertical, polarization direction antenna but refraining from using a second, e.g., horizontal direction antenna. Continuing with the example, in a second iteration, the wireless terminal may be assigned to a third, e.g., tilted, polarization direction antenna mode of operation, be subsequently assigned to a second uplink traffic channel segment, and transmit uplink traffic channel segment signals using both a first polarization direction antenna and a second polarization direction antenna, e.g., an antenna designated as a vertical polarization direction antenna and an antenna designated as a horizontal polarization direction antenna. It is to be understood that at the time of transmission the wireless terminal may be, and sometimes is tilted, in which case the designated vertical and horizontal direction antennas do not necessarily correspond to local vertical and local horizontal directions.

Although illustrated for a single communications segment assignment, in various embodiments, the wireless terminal receives, processes and acts upon communications segment assignments corresponding to a plurality of communications segments, e.g., a set of uplink communications segments, before receiving another signal from the access node indicating the assigned mode of polarized antenna operation to be used by the wireless terminal.

In some embodiments, an assigned antenna mode of operation is communicated in the same message with a segment assignment, e.g., an uplink traffic channel segment assignment. In some such embodiments, data rate information is also communicated in the same segment assignment message.

Figure 5:
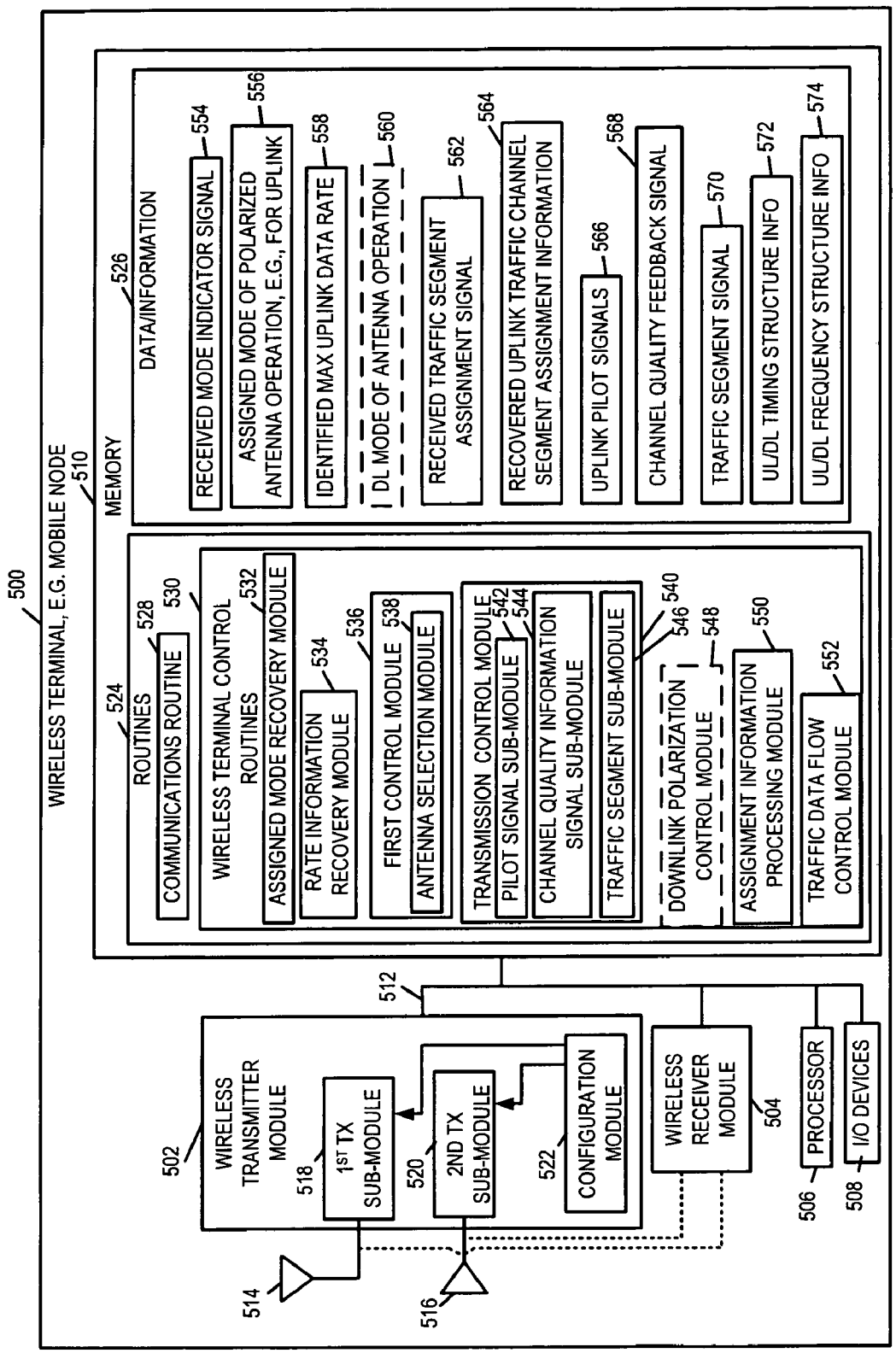
FIG. 5 illustrates an exemplary wireless terminal in accordance with one exemplary embodiment.

FIG. 5 is a drawing of an exemplary wireless terminal, e.g., mobile node, in accordance with various embodiments. Wireless terminal 500, is sometimes referred to as an access terminal. Exemplary wireless terminal 500 includes a wireless transmitter module 502, a wireless receiver module 504, a processor 506, I/O devices 508 and a memory 510 coupled together via a bus 512 over which the various elements may exchange data and information. Memory 510 includes routines 524 and data/information 526. The processor 506, e.g., a CPU, executes the routines 524 and uses the data/information 526 in memory 510 to control the operation of the wireless terminal 500 and implement methods, e.g., the method of flowchart 400 of FIG. 4.

Wireless transmitter module 502 transmits a signal to an access node while configured in an assigned polarized mode of operation, e.g., an uplink traffic channel segment signal. Wireless transmitter module 402 includes a $1^{st}$ transmitter sub-module 518, a $2^{nd}$ transmitter sub-module 520, and a configuration module 522. The $1^{st}$ transmitter sub-module 518 is coupled to a first polarization direction antenna 514, e.g., an antenna designated as a vertical polarization direction antenna. The $2^{nd}$ transmitter sub-module 520 is coupled to a second polarization direction antenna 516, e.g., an antenna designates as a horizontal polarization direction antenna. The configuration module 522 is, in this embodiment, coupled to $1^{st}$ and $2^{nd}$ receiver sub-modules (518, 518) and controls uplink signaling configuration, e.g., enabling one or more of sub-modules (518, 520) under the direction of the first control module 536. The sub-modules (518, 520) in some embodiments, include switching devices for controlling connecting the polarization antennas (514, 516) to an output stage.

Wireless receiver module 504 which is controllable coupled to one or more of first polarization direction antenna 514 and second polarization direction antenna 516, e.g., under control of the downlink polarization control mode module 548. The wireless receiver module 504 receives downlink signals from an access node, e.g., base station. Received downlink signals include a mode indicator signal from an access node indicating an assigned mode of antenna operation to be used when communicating with the access node, e.g., when transmitting uplink traffic channel segment signals to the access node. Received mode indicator signal 554 represents such a signal received by wireless receiver module 504. Other received downlink signals include rate information signals, and traffic segment assignment signals, e.g., received traffic segment assignment signal 562. In some embodiments, some of these signals are communicated in a combined message, e.g., a segment assignment message including a wireless terminal identifier, a wireless terminal antenna mode of operation indicator and data rate information.

I/O devices 508 include, e.g., microphone, keyboard, keypad, switches, camera, speaker, display, etc. I/O devices 508 allow a user of wireless terminal 500 to input data/information, access output data/information, and control at least some functions of the wireless terminal 500.

Routines 524 include a communications routine 528 and wireless terminal control routines 530. The communications routine 528 implements the various communications protocols used by the wireless terminal 500.

The wireless terminal control routines 530 include an assigned mode recovery module 532, a rate information recovery module 534, a first control module 536, a transmission control module 540, an assignment information processing module 550, and a traffic data flow control module 552. In some embodiments, the wireless terminal control routines 530 include a downlink polarization control module 548.

Assigned mode recovery module 532 determines, e.g., via operations including decoding, an assigned mode of polarized operation. In some embodiments, the assigned mode of polarized antenna operation is one of: i) a first mode which a vertical polarization direction mode, ii) a second mode which is a horizontal polarization direction mode. In some embodiments, the assigned mode of polarized antenna operation is one of: i) a first mode which a vertical polarization direction mode, ii) a second mode which is a horizontal polarization direction mode, and iii) a third mode which is a tilted mode. Assigned mode recovery module 532 processes received mode indicator signal 554 and obtains an assigned mode of polarized operation 556, which is stored in memory 526. In various embodiments the assigned mode of polarized operation refers to an uplink mode of operation, e.g., a mode to be used for uplink traffic signaling.

Rate information recovery module 534 recovers rate information corresponding to the assigned mode of polarized antenna operation, e.g., identified maximum uplink data rate 568 corresponding to assigned mode of polarized operation 556. In some embodiments, the rate information is communicated in the same signal or message as the received assigned mode, e.g., received mode indicator signal 554. In other embodiments separate signals are used to communicate the assigned mode of polarized antenna operation and corresponding rate information. In some embodiments, data rate information is communicated with segment assignment information. In some embodiments, antenna mode polarization information and segment assignment information are communicated in the same message. In some such embodiments, the message also includes data rate information, e.g., information identifying an actual or maximum data rate to be used for the segment.

First control module 536, e.g., an uplink control module, includes an antenna selection module 538. The antenna selection module 538 selects which of the available $1^{st}$ and second antennas (514, 516) are to be used at a given point in time. Transmission control module 540 includes a pilot signal sub-module 542, a channel quality information signal sub-module 544, and a traffic segment sub-module 546. First control module 536 controls the wireless terminal to configure the wireless terminal to use the antennas (514, 516) in accordance with the assigned mode of polarized operation. Thus first control module 536 controls the configuration module 522 to implement a configuration matching an assigned mode. For example, in a first mode the first control module 536 controls the configuration module 522 to enable $1^{st}$ transmitter sub-module 518 and disable $2^{nd}$ transmitter sub-module 520 thus allowing signals to be transmitted via first direction polarization antenna 518 but not via second direction polarization antenna 516. In a second mode the first control 536 control the configuration module 522 to enable $2^{nd}$ transmitter sub-module 520 and disable $1^{st}$ transmitter sub-module 518 thus allowing signals to be transmitted via second direction polarization antenna 516 but not via first direction polarization antenna 514. Continuing with the example, in a third mode, the first control module 536 controls the configuration module 522 to enable both $1^{st}$ and second transmitter sub-modules (518, 520), thus allowing signals to be transmitted via both $1^{st}$ and $2^{nd}$ direction polarization antenna (514, 516), concurrently.

Transmission control module 540 controls the wireless terminal to transmit uplink signals to an access node. Pilot signal sub-mode 542 controls the wireless terminal to transmit uplink pilot signals 566. In various embodiments, pilot signals are communicated via both antennas (514, 516), e.g., different pilots on the different polarization antennas. Channel quality indicator sub-module 544 controls the wireless terminal to transmit channel quality indicator feedback signal 568, e.g., an SNR report, an SIR report, channel matrix information, rank information, etc. Traffic segment sub-module 546 controls the wireless terminal to transmit traffic segment signal 568. The traffic segment signal controlled to be transmitted while the wireless terminal is controlled to be in the assigned mode of polarized antenna operation indicated by information 556, e.g., one of vertical polarization mode, a horizontal polarization mode and a tilted mode. In some embodiments, pilot signals are communicated using both direction polarization antennas, e.g., to facility channel characterization. In some embodiments, channel quality feedback signals are communicated using both direction polarization antennas, e.g., to increase the likelihood of signal reception and recovery.

Downlink polarization control module 548 control the wireless terminal 500 to operate at different times in different downlink polarization modes of polarized antenna operation, wherein the receiving is performed using an antenna or antennas corresponding to the downlink mode of polarized antenna operation in which the wireless terminal is operating, e.g., as indicated by DL mode of antenna operation 560.

Assignment information processing module 550 processes a received traffic segment assignment signal, e.g., signal 562, obtaining recovered traffic channel segment assignment information 564, which may indicate that wireless terminal 500 is assigned to use a specific uplink traffic channel segment. In some embodiments, the communications segment being assigned is a communications segment to be used by two wireless terminals at the same time but with the two wireless terminals using different antenna polarizations, and the communications assignment indicates that wireless terminal 500 is one of the two wireless terminals. In some embodiments, the communications segment being assigned is a communications segment to be used by a single wireless terminal using two different direction antenna polarization antennas concurrently, and the communications assignment indicates that wireless terminal 500 is the assigned wireless terminal.

Traffic data flow control module 552 controls transmission of a portion of traffic data. The traffic data flow control module 552 controls transmission of the same data during a first period of time to be performed from said first and second antennas (514, 516) in parallel and controls transmission of data during a second period of time from at most one of the first and second antennas (514, 516), said first and second periods of time being determined from the assigned mode of operation. For example, the first period of time is a time corresponding to an uplink traffic channel segment assigned to wireless terminal 500 in which wireless terminal 500 has been assigned to operate in the uplink tilted mode of operation, and the second period of time is a time corresponding to an uplink traffic channel segment assigned to wireless terminal 500 in which wireless terminal 500 has been assigned to operate in one of a vertical polarization mode of operation and a horizontal polarization mode of operation.

Data/information 526 includes a received mode indicator signal 554, an assigned mode of polarized antenna operation 556, an identified maximum uplink data rate 558, a received traffic segment assignment signal 562, recovered uplink traffic channel segment assignment information 564, uplink pilot signals 566, a channel quality feedback signal 568, a traffic segment signal 570, uplink/downlink timing structure information 572 and uplink/downlink frequency structure information 574. In some embodiments, data/information 526 includes a downlink mode of antenna operation 560. The uplink/downlink timing structure information 572 includes, e.g., recurring timing structure information including symbol timing information, information identifying grouping of symbols, information identifying positions in time of pilots, channel information signals, assignments signals, and traffic segment signals. In TDD embodiments, the timing structure information 572 includes information identifying when a communications band is to be used for uplink signaling and when it is to be used for downlink signaling. The uplink/downlink frequency structure information 574 includes information identifying: carrier frequencies, downlink frequency bands, uplink frequency bands, tone specifications, number of tones used in a band, tones in a signal or segment, tone hopping information, etc. In FDD embodiments, the uplink/downlink frequency structure information 574 includes information identifying the uplink band and the downlink band.

Figure 6:
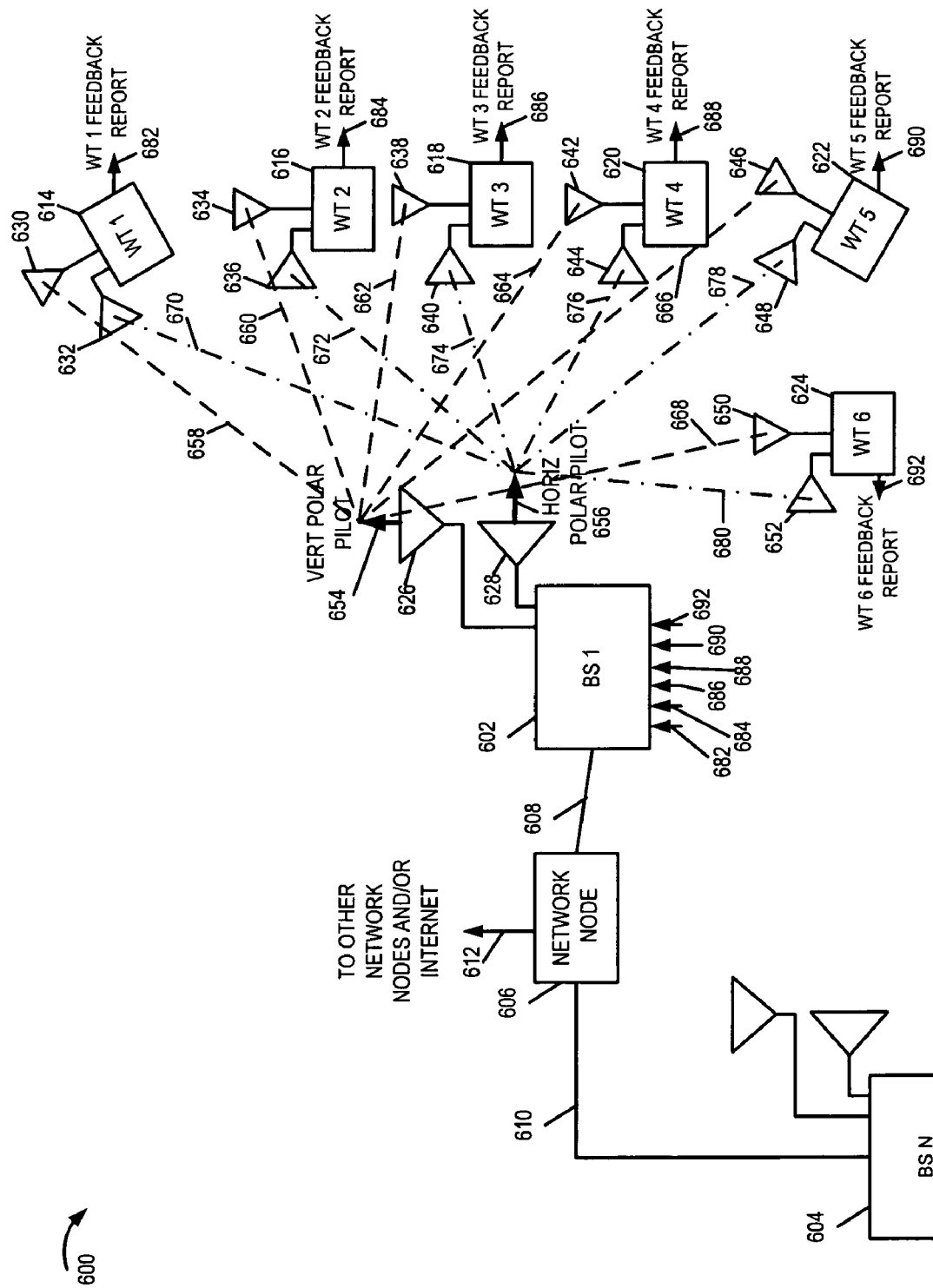
FIG. 6 is a drawing of an exemplary communications system in accordance with various embodiments.

FIG. 6 is a drawing of an exemplary communications system 600 in accordance with various embodiments. FIG. 6 is used to illustrate various aspects of some embodiments. Exemplary communications system 600 is, e.g., a TDD system in which the downlink and uplink use the same frequency spectrum during different non-overlapping time intervals. Exemplary communications 600 includes a plurality of base stations (base station 1 602, . . . , base station N 604), a network node 606 and a plurality of wireless terminals (WT 1 614, WT 2 616, WT 3, 618, WT 4 620, WT 5 622, WT 6 624). The base stations (602, 604) are coupled to network node 606 via network links (608, 610), respectively. Network node 606 is coupled to other network nodes and/or the Internet via network link 612. Network links (608, 610, 612) are, e.g., fiber optic links. The wireless terminals (614, 616, 618, 620, 622, 624) are, e.g., stationary and/or mobile nodes, which may couple to a base station via a wireless link. In some embodiments, base stations (602, 604) are base stations 300 of FIG. 3 and/or base stations which implement a method in accordance with flowchart 200 of FIG. 2. In some embodiments, wireless terminals (614, 616, 618, 620, 622, 624) are wireless terminals 500 of FIG. 5 and/or wireless terminals which implement a method in accordance with flowchart 400 of FIG. 4.

The base stations (602, 604) support polarization diversity aid include antennas corresponding to two different polarization directions. Base station 1 602 includes a vertical polarization antenna 626 and a horizontal polarization antenna 628. The base station 602 can, and sometimes does schedule two different wireless terminals to use the same time/frequency slab, e.g., uplink traffic channel segment, with a first of the two wireless terminals being assigned to use vertical polarization and a second of the two wireless terminals being assigned to use horizontal polarization. In order to schedule in a efficient manner, the base station 602 characterizes the wireless terminals which would like to use the resources.

In this example, the base station 602 broadcasts vertical polarization pilot signals 654 from its vertical polarization antenna 626 and broadcasts horizontal polarization pilot signals 656 from its horizontal polarization antenna 628. Each of the wireless terminals (WT 1 614, WT 2 616, WT 3 618, WT 4 620, WT 5 622, WT 6 624) includes a designated vertical polarization antenna and a designated horizontal antenna ((630, 632), (634, 636), ((638, 640), (642, 644), (646, 648), (650, 652), respectively.

Wireless terminal 1 614 receives the base station transmitted vertical polarization pilot signals 654 via its designated vertical polarization antenna 630 as indicated by dashed line 658. Wireless terminal 1 614 receives the base station transmitted horizontal polarization pilot signals 656 via its designated horizontal polarization antenna 632 as indicated by dash/dot line 670. WT 1 614 processes the received pilot signals and generates a feedback report 682.

Wireless terminal 2 616 receives the base station transmitted vertical polarization pilot signals 654 via its designated vertical polarization antenna 634 as indicated by dashed line 660. Wireless terminal 2 616 receives the base station transmitted horizontal polarization pilot signals 656 via its designated horizontal polarization antenna 636 as indicated by dash/dot line 672. WT 2 616 processes the received pilot signals and generates a feedback report 684.

Wireless terminal 3 618 receives the base station transmitted vertical polarization pilot signals 654 via its designated vertical polarization antenna 638 as indicated by dashed line 662. Wireless terminal 3 618 receives the base station transmitted horizontal polarization pilot signals 656 via its designated horizontal polarization antenna 640 as indicated by dash/dot line 674. WT 3 618 processes the received pilot signals and generates a feedback report 686.

Wireless terminal 4 620 receives the base station transmitted vertical polarization pilot signals 654 via its designated vertical polarization antenna 642 as indicated by dashed line 664. Wireless terminal 4 620 receives the base station transmitted horizontal polarization pilot signals 656 via its designated horizontal polarization antenna 644 as indicated by dash/dot line 676. WT 4 620 processes the received pilot signals and generates a feedback report 688.

Wireless terminal 5 622 receives the base station transmitted vertical polarization pilot signals 654 via its designated vertical polarization antenna 646 as indicated by dashed line 666. Wireless terminal 5 622 receives the base station transmitted horizontal polarization pilot signals 656 via its designated horizontal polarization antenna 648 as indicated by dash/dot line 678. WT 5 622 processes the received pilot signals and generates a feedback report 690.

Wireless terminal 6 624 receives the base station transmitted vertical polarization pilot signals 654 via its designated vertical polarization antenna 650 as indicated by dashed line 668. Wireless terminal 6 624 receives the base station transmitted horizontal polarization pilot signals 656 via its designated horizontal polarization antenna 652 as indicated by dash/dot line 680. WT 6 624 processes the received pilot signals and generates a feedback report 692.

Various alternative formats are possible for the feedback reports (682, 684, 686, 688, 690, 692). For example a feedback report, e.g. feedback report 682, conveys at least one of: (i) a vertical pilot signal received strength measurement and a horizontal pilot signal received strength measurement, (ii) a SNR value for the vertical polarization direction and an SNR value for the horizontal polarization direction, (iii) a SIR value for the vertical polarization direction and a SIR value for the horizontal polarization direction, (iv) a indicator as to whether single direction polarization communication is acceptable, (v) a indication as to a preference for single direction polarization communication or dual polarization communication, (vi) an indication for a preference for one of horizontal direction polarization communication and vertical direction polarization communication. Other variations of feedback information used to characterize the channel are possible, e.g., the wireless terminal feeds back information corresponding to the best of the single direction horizontal and vertical polarization from the perspective of the wireless terminal, or the wireless terminal feeds back information corresponding to acceptable polarization alternatives but refrains from communicating information corresponding to unacceptable alternatives.

The feedback reports (682, 684, 686, 688, 690, 692) are communicated from the wireless terminals (614, 616, 618, 62Q, 622, 624) to the base station 602 via wireless communications. In some embodiments, the wireless terminals and base stations use both polarization direction antenna, e.g., to increase the likelihood of the base station 602 reliably receiving the report. The base station 602 processes the received feedback reports (682, 684, 686, 688, 690, 692) and makes scheduling decisions, e.g., deciding which wireless terminals are suitable for using a shared uplink traffic channel segment using vertical polarization, which wireless terminal are suitable for using a shared uplink traffic channel segment using horizontal polarization, which wireless terminals are unsuitable for using a single polarization direction and should use both polarization direction antennas concurrently, assigning wireless terminals to modes of operation, and assigning uplink traffic channel segments.

In this example, it may be observed that WT 2 616, WT 3 618, WT 4 620 and WT 6 626 are substantially not tilted, e.g., aligned with the local vertical. However, WT 1 614 and WT 5

622 are substantially tilted from the local vertical. In general, wireless terminals which are substantially not tilted are candidates for single polarization direction antenna uplink traffic segment assignments since a base station and such a wireless more likely to be substantially aligned with respect to a receiver/transmitter antenna pair for a single polarization antenna and are more likely to experience good channel conditions using a single polarization antenna and cause less interference in the other polarization direction. However, wireless terminals which are substantially tilted are generally not candidates for single polarization communications in a shared segment based on polarization and are to be assigned to use both polarization direction antennas for an assigned segment. Of course, other factors, which may be, and sometimes are, reflected in the feedback report, influence the classification and/or assignment, e.g., transmission medium, obstacles, reflections, receiver capabilities, noise, distance between receiver and transmitter, power considerations, etc.

Figure 7:
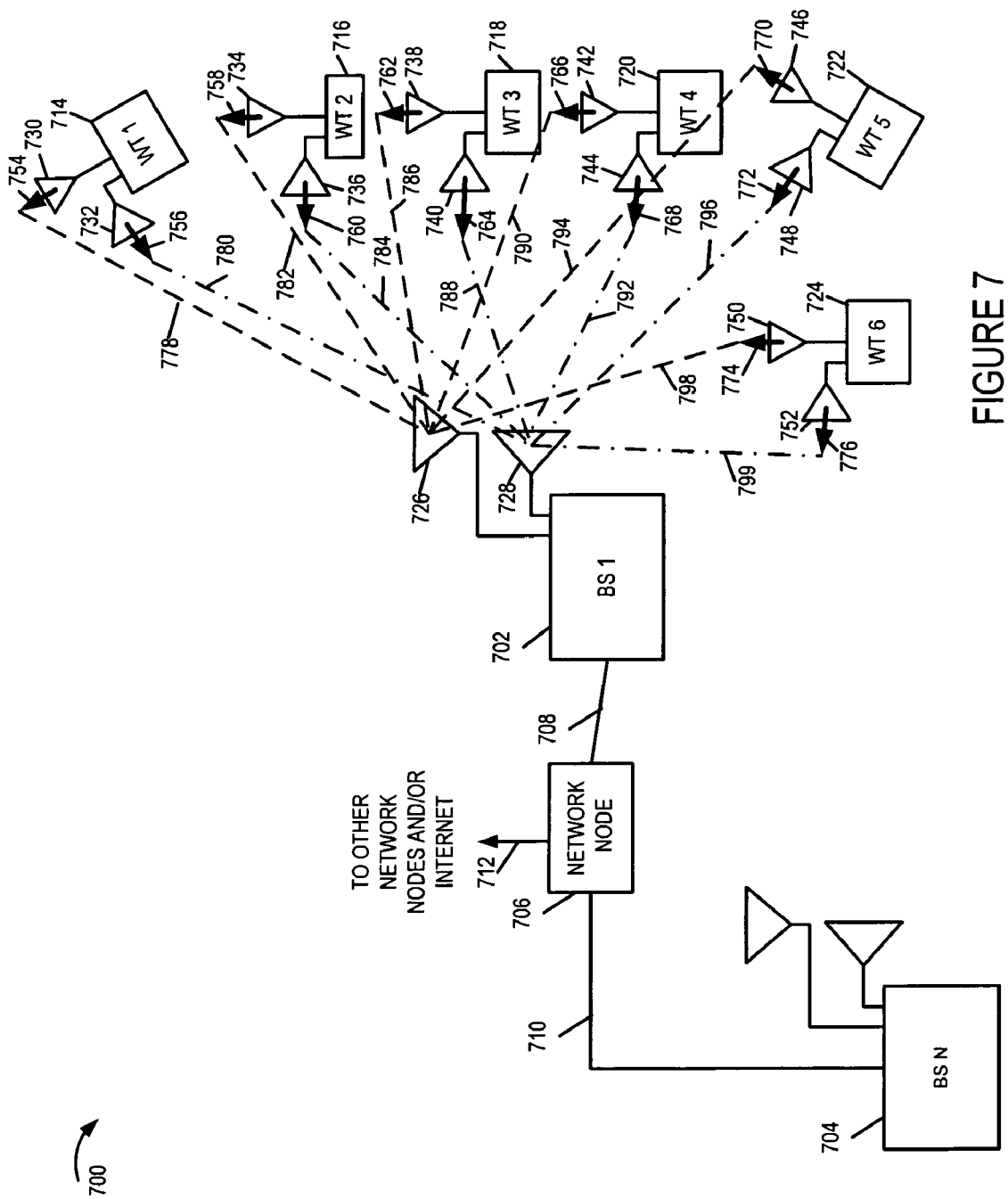
FIG. 7 is a drawing of an exemplary communications system in accordance with various embodiments.

FIG. 7 is a drawing of an exemplary communications system 700 in accordance with various embodiments. FIG. 7 is used to illustrate various aspects of some embodiments. Exemplary communications system 700 is, e.g., a frequency division duplex (FDD) system in which the downlink and uplink use different frequency spectrums concurrently. Exemplary communications 700 includes a plurality of base stations (base station 1 702, . . . , base station N 704), a network node 706 and a plurality of wireless terminals (WT 1 714, WT 2 716, WT 3, 718, WT 4 720, WT 5 722, WT 6 724). The base stations (702, 704) are coupled to network node 706 via network links (708, 710), respectively. Network node 706 is coupled to other network nodes and/or the Internet via network link 712. Network links (708, 710, 712) are, e.g., fiber optic links. The wireless terminals (714, 716, 718, 720, 722, 724) are, e.g., stationary and/or mobile nodes, which may couple to a base station via a wireless link. In some embodiments, base stations (702, 704) are base stations 300 of FIG. 3 and/or base stations which implement a method in accordance with flowchart 200 of FIG. 2. In some embodiments, wireless terminals (714, 716, 718, 720, 722, 724) are wireless terminals 500 of FIG. 5 and/or wireless terminals which implement a method in accordance with flowchart 400 of FIG. 4.

The base stations (702, 704) support polarization diversity and include antennas corresponding to two different polarization directions. Base station 1 702 includes a vertical polarization antenna 726 and a horizontal polarization antenna 728. The base station 702 can, and sometimes does, schedule two different wireless terminals to use the same time/frequency slab, e.g., uplink traffic channel segment, with a first of the two wireless terminals being assigned to use vertical polarization and a second of the two wireless terminals being assigned to use horizontal polarization. In order to schedule in an efficient manner, the base station 702 characterizes the wireless terminals which would like to use the resources.

In this example, the wireless terminals (WT 1 714, WT 2 716, WT 3 718, WT 4 720, WT 5 722, WT 6 724) transmit uplink pilot signals from each polarization direction antenna, which are received and processed by the base station 702. WT 1 714 transmits vertical polarization uplink pilot signal 754 from vertical polarization direction antenna 730 which is received the base station vertical polarization direction antenna 726 as indicated by dashed line 778. WT 1 714 transmits horizontal polarization uplink pilot signal 756 from horizontal polarization direction antenna 732 which is received the base station horizontal polarization direction antenna 728 as indicated by dash-dot line 780.

WT 2 716 transmits vertical polarization uplink pilot signal 758 from vertical polarization direction antenna 734 which is received the base station vertical polarization direction antenna 726 as indicated by dashed line 782. WT 2 716 transmits horizontal polarization uplink pilot signal 760 from horizontal polarization direction antenna 736 which is received the base station horizontal polarization direction antenna 728 as indicated by dash-dot line 784.

WT 3 718 transmits vertical polarization uplink pilot signal 762 from vertical polarization direction antenna 738 which is received the base station vertical polarization direction antenna 726 as indicated by dashed line 786. WT 3 718 transmits horizontal polarization uplink pilot signal 764 from horizontal polarization direction antenna 740 which is received the base station horizontal polarization direction antenna 728 as indicated by dash-dot line 788.

WT 4 720 transmits vertical polarization uplink pilot signal 766 from vertical polarization direction antenna 742 which is received the base station vertical polarization direction antenna 726 as indicated by dashed line 790. WT 4 720 transmits horizontal polarization uplink pilot signal 768 from horizontal polarization direction antenna 744 which is received the base station horizontal polarization direction antenna 728 as indicated by dash-dot line 792.

WT 5 722 transmits vertical polarization uplink pilot signal 770 from vertical polarization direction antenna 746 which is received the base station vertical polarization direction antenna 726 as indicated by dashed line 794. WT 5 722 transmits horizontal polarization uplink pilot signal 772 from horizontal polarization direction antenna 748 which is received the base station horizontal polarization direction antenna 728 as indicated by dash-dot line 796.

WT 6 724 transmits vertical polarization uplink pilot signal 774 from vertical polarization direction antenna 750 which is received the base station vertical polarization direction antenna 726 as indicated by dashed line 798. WT 6 724 transmits horizontal polarization uplink pilot signal 776 from horizontal polarization direction antenna 752 which is received the base station horizontal polarization direction antenna 728 as indicated by dash-dot line 799.

The base station 702 processes the received pilot signals and makes scheduling decisions, e.g., deciding which wireless terminals are suitable for using a shared uplink traffic channel segment using vertical polarization, which wireless terminal are suitable for using a shared uplink traffic channel segment using horizontal polarization, which wireless terminals are unsuitable for using a single polarization direction and should use both polarization direction antennas concurrently, assigning wireless terminals to modes of operation, and assigning uplink traffic channel segments. In various embodiments, other uplink signals are used in addition to or in place of uplink pilots, e.g., uplink control channel signals communicated from the two different polarization direction antennas of a wireless terminal are utilized to characterize the wireless terminal and/or make scheduling decisions for uplink traffic channel segments.

In this example, it may be observed that WT 2 716, WT 3 718, WT 4 720 and T 6 726 are substantially not tilted, e.g., aligned with the local vertical. However, WT 1 714 and WT 5 722 are substantially tilted from the local vertical. In general, wireless terminals which are substantially not tilted are candidates for single polarization direction antenna uplink traffic segment assignments since a base station and such a wireless more likely to be substantially aligned with respect to a receiver/transmitter antenna pair for a single polarization antenna and are more likely to experience good channel conditions using a single polarization antenna and cause less interference in the other polarization direction. However, wireless terminals which are substantially tilted are generally not candidates for single polarization communications in a shared segment based on polarization and are to be assigned to use both polarization direction antennas for an assigned segment. Of course, other factors, which may be, and sometimes are, reflected in the feedback report, influence the classification and/or assignment, e.g., transmission medium, obstacles, reflections, receiver capabilities, noise, distance between receiver and transmitter, power considerations, etc.

Figure 8:
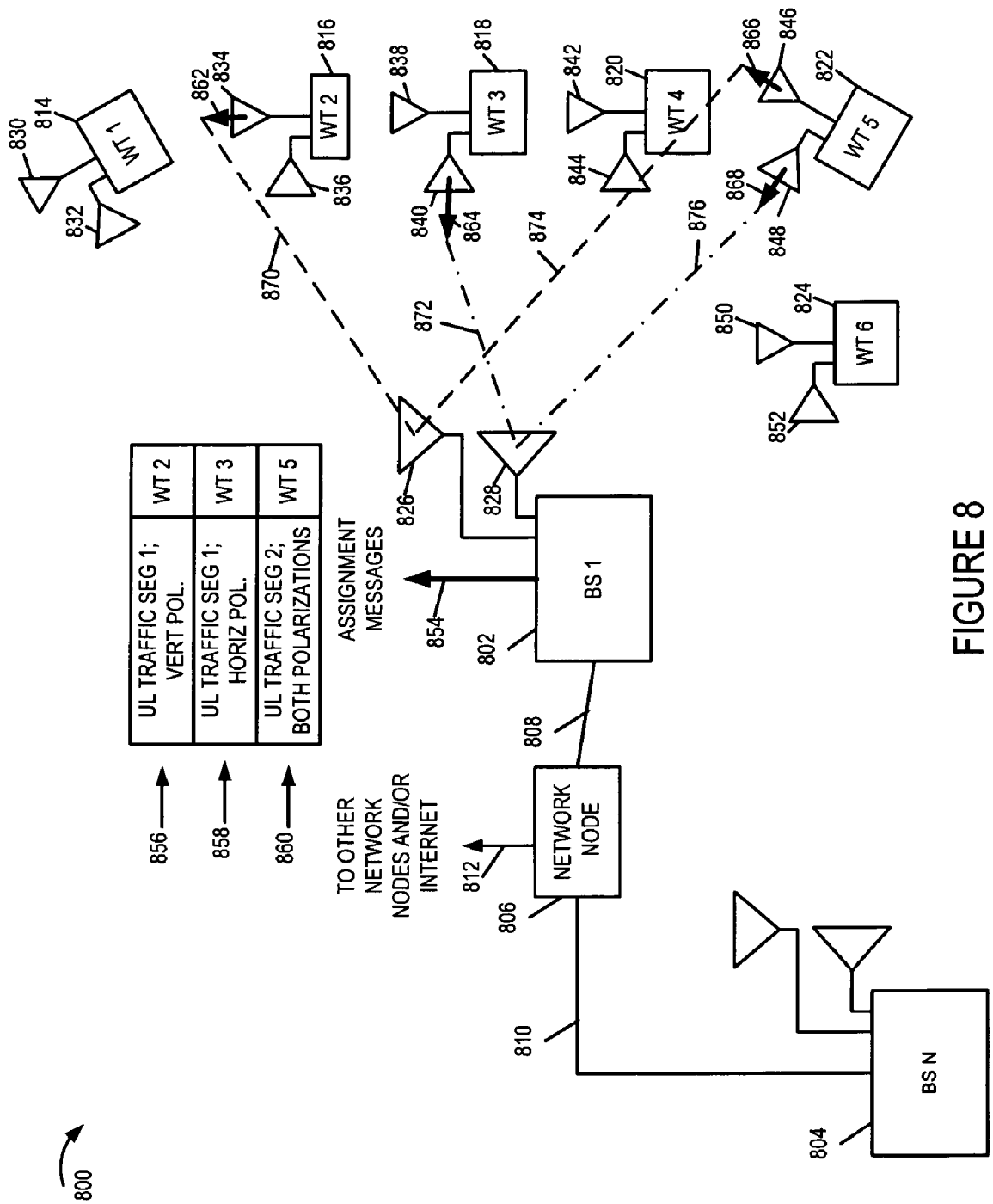
FIG. 8 is a drawing of an exemplary communications system in accordance with various embodiments.

FIG. 8 is a drawing of an exemplary communications system 800 in accordance with various embodiments. FIG. 8 is used to illustrate various aspects of some embodiments. Exemplary communications system 800 is, e.g., one of exemplary communications system 600 of FIG. 6 and exemplary communications system 700 of FIG. 7. Exemplary communications 800 includes a plurality of base stations (base station 1 802, . . . , base station N 804), a network node 806 and a plurality of wireless terminals (WT 1 814, WT 2 816, WT 3, 818, WT 4 820, WT 5 822, WT 6 824). The base stations (802, 804) are coupled to network node 806 via network links (808, 810), respectively. Network node 806 is coupled to other network nodes and/or the Internet via network link 812. Network links (808, 810, 812) are, e.g., fiber optic links. The wireless terminals (814, 816, 818, 820, 822, 824) are, e.g., stationary and/or mobile nodes, which may couple to a base station via a wireless link. In some embodiments, base stations (802, 804) are base stations 300 of FIG. 3 and/or base stations which implement a method in accordance with flowchart 200 of FIG. 2. In some embodiments, wireless terminals (814, 816, 818, 820, 822, 824) are wireless terminals 500 of FIG. 5 and/or wireless terminals which implement a method in accordance with flowchart 400 of FIG. 4. In some embodiments the devices (802, 804, 814, 816, 818, 820, 822, 824) of FIG. 8 are devices (602, 604, 614, 616, 618, 620, 622, 624) of FIG. 6. In some embodiments the devices (802, 804, 814, 816, 818, 820, 822, 824) of FIG. 8 are devices (702, 704, 714, 716, 718, 720, 722, 724) of FIG. 7.

The base stations (802, 804) support polarization diversity and include antennas corresponding to two different polarization directions. Base station 1 802 includes a vertical polarization antenna 826 and a horizontal polarization antenna 828. The base station 802 can, and sometimes does, schedule two different wireless terminals to use the same time/frequency slab, e.g., uplink traffic channel segment, with a first of the two wireless terminals being assigned to use vertical polarization and a second of the two wireless terminals being assigned to use horizontal polarization. In order to schedule in an efficient manner, the base station 802 characterizes the wireless terminals which would like to use the resources.

In this example, we assume that base station 802 has already received information used to characterize the wireless terminals and make scheduling decisions, e.g., feedback information from downlink pilots such as shown in FIG. 6 or uplink signals such as uplink pilots as shown in FIG. 7. Based on the wireless terminal characterization information, the base station 802 makes scheduling decisions and sends assignment messages 754, e.g., broadcast assignment signals communicated using both polarization direction antennas (826, 828) to increase transmission reliability.

In some embodiments, the base station characterizes the wireless terminals under consideration into categories or groups. Some such groups or categories include one or more of the following: wireless terminals suitable to transmit single polarization direction uplink signals, wireless terminals not suitable to transmit single polarization direction uplink signals, wireless terminals suitable to transmit vertical polarization direction uplink signals, wireless terminals suitable to transmit horizontal polarization direction uplink signals, substantially tilted wireless terminals, wireless terminals which are substantially not tilted, etc. In some such embodiments, the wireless terminals classification information is communicated via an assignment signals independent of the individual uplink segment assignment, e.g., prior to the segment assignment. For example, in one example, base station 1 802 decides and communicates, that (i) WT 1 814 and WT 5 822 are to be classified as wireless terminals which are to use both direction polarization antennas in an assigned uplink segment; (ii) WT 2 816 and WT 6 824 are to use vertical polarization direction antenna for an assigned uplink segment; and (iii) that WT 3 818 and WT 4 820 are to use horizontal polarization direction antennas for an assigned uplink segment. In some such embodiments, a particular WT need only monitor uplink segment assignment messages corresponding to its particular classification after receiving a mode assignment message. For example, a predetermined uplink traffic channel segment assignment structure may be implemented with some segments being reserved for a single wireless terminal using both polarization direction antennas, while other segments may be reserved to be used in a shared manner with two different wireless terminals being assigned to a single different polarization direction for the same segment.

Alternatively, in some embodiments, an assignment message for a segment can convey information identifying the wireless terminal to which the segment is assigned and information identifying the polarization to be used, e.g., horizontal, vertical, or both directions. This approach of embedding the polarization direction information in the individual segment assignment has the advantage of not having to send prior polarization grouping classification messages to wireless terminals which may not be assigned a segment. This approach also allows more flexibility in adjusting the balance of segment assignment type usage, e.g., the mix between single direction polarization shared segments and dual polarization segments, as system conditions vary. However, the other approach of sending independent type classification information, in some embodiments, reduces signaling overhead, e.g., where wireless terminals remain in the same classification for a relatively long interval. Thus different approaches of signaling the assignment information are more advantageous for different particular deployments. In some embodiments, data rate information is also included in the assignment messages, e.g., in messages including wireless terminals classification information and/or in messages including individual segment assignments.

In this example, the assignment messages 854 convey information including: information 856 identifying that WT 2 is assigned uplink traffic segment 1 and is to use its designated vertical polarization direction antenna for communications; information 858 identifying that WT 3 is assigned uplink traffic segment 1 and its to use its designated horizontal polarization direction antenna for communications; and information 860 identifying the WT 5 is assigned uplink traffic segment 2 and is assigned to used both its vertical and horizontal direction polarization antennas for communication.

WT 1 814 having monitored the broadcast assignment messages 854 recognizes that it is not assigned a segment and refrains from transmitting uplink traffic signals on its antennas (830, 832). WT 2 816 having monitored the broadcast assignment messages 854 recognizes that it is assigned segment 1 and is assigned to use vertical polarization and thus transmits uplink traffic signals 862 from its vertical polarization direction antenna 834 using the time/frequency slab for segment 1 and refrains from transmitting uplink traffic signals on its horizontal polarization direction antenna 836. WT 3 818 having monitored the broadcast assignment messages 854 recognizes that it is assigned segment 1 and is assigned to use horizontal polarization and thus transmits uplink traffic signals 864 from its horizontal polarization direction antenna 840 using the time/frequency slab for segment 1 and refrains from transmitting uplink traffic signals on its vertical polarization direction antenna 838. WT 4 820 having monitored the broadcast assignment messages 854 recognizes that it is not assigned a segment and refrains from transmitting uplink traffic signals on its antennas (842, 844). WT 5 822 having monitored the broadcast assignment messages 854 recognizes that it is assigned segment 2 and is assigned to use both vertical polarization and horizontal polarization and thus transmits uplink traffic signals 866 from its vertical polarization direction antenna 846 and transmits uplink signals 868 from its horizontal polarization antenna 848 using the time/frequency slab for segment 2. WT 6 824 having monitored the broadcast assignment messages 854 recognizes that it is not assigned a segment and refrains from transmitting uplink traffic signals on its antennas (850, 852).

Base station vertical polarization direction antenna 826 collects signals (862, 866) as indicated by dotted lines (870, 874). Base station horizontal polarization direction antenna 828 collects signals (840, 868) as indicated by dash-dot lines (872, 876).

Although illustrated primarily for uplink mode of operation and uplink segments, e.g., uplink traffic channel segments, the approach of having, assigning and using different modes of antenna polarization is also suitable, and in some embodiments used, with regard to downlink modes of operation and downlink signaling, e.g., with regard to downlink traffic channel segment assignment signaling.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

In some embodiments, the processor or processors, e.g., CPUs, of one or more devices, e.g., communications devices such as access nodes and/or wireless terminals, are configured to perform the steps of the methods described as being performed by the communications device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

The invention claimed is:

1. A method of operating an access node, the method comprising:
storing information indicating assignment of a first set of wireless terminals to a first polarized antenna mode of operation;
storing information indicating assignment of a second set of wireless terminals to a second polarized antenna mode of operation which is different from the first polarized antenna mode of operation;
assigning a wireless terminal to operate in one of said first and second polarized antenna modes of operation based on a signal received from said wireless terminal, the signal being one of: i) a pilot signal received from the wireless terminal or ii) a channel quality information signal received from the wireless terminal;
signaling to the wireless terminal, a mode of polarized antenna operation to be used;
wherein said access node is a base station; and
wherein said wireless terminal is a user device.

2. The method of claim 1, wherein said first and second modes of polarized antenna operation are vertical and horizontal modes of antenna operation.

3. The method of claim 1, wherein said mode of polarized antenna operation to be used which is signaled to said wireless terminal is an uplink mode of polarized antenna operation to be used for transmitting signals to said access node.

4. The method of claim 3, wherein said wireless terminal operates in a downlink mode of polarized antenna operation which is different from the uplink mode of antenna operation being signaled, said signaling being performed using an antenna corresponding to the downlink mode of polarized antenna operation in which said wireless terminal is operating.

5. The method of claim 1, further comprising:
assigning a first communications segment to be used by two wireless terminals at the same time, said assigning including selecting a first wireless terminal from the first set of wireless terminals and a second wireless terminal from the second set of wireless terminals.

6. The method of claim 1, further comprising:
storing information indicating assignment of a third set of wireless terminals, said third set of wireless terminals operating in a tilted mode of antenna polarization operation; and
assigning a second communications segment to be used by a single wireless terminal, said assigning including selecting a third wireless terminal from the third set of wireless terminals.

7. The method of claim 6, further comprising:
assigning a first communications segment to be used by two wireless terminals at the same time, said assigning including selecting a first wireless terminal from the first set of wireless terminals and a second wireless terminal from the second set of wireless terminals.

8. The method of claim 7,
wherein the first and second communications segments correspond to the same time; and
wherein said first and second communications segments are uplink traffic channel segments.

9. The method of claim 7, further comprising:
recovering information from the first communications segment without combining signals from first and second antennas having said first and second polarizations respectively.

10. An access node, the access node comprising:
memory including information indicating assignment of a first set of wireless terminals to a first polarized antenna mode of operation and assignment of a second set of wireless terminals to a second polarized antenna mode of operation which is different from the first polarized antenna mode of operation;
an assignment module for assigning wireless terminals to operate in one of said first and second polarized antenna modes of operation, said assigning for an individual one of said wireless terminals being based on a signal received from said individual one of the wireless terminals, the signal being one of: i) a pilot signal or ii) a channel quality information signal;
a transmitter module for signaling to a wireless terminal, a mode of polarized antenna operation to be used;
wherein said access node is a base station; and
wherein said wireless terminal is a user device.

11. The access node of claim 10, further comprising:
a communications rate information generation module for generating communications rate information relating to communications between said wireless terminal and said base station; and
a signal generation module for generating a rate information signal to be transmitted to said wireless terminal in addition to the mode of polarized antenna operation to be used.

12. The access node of claim 10, wherein said mode of polarized antenna operation to be used which is signaled to said wireless terminal is an uplink mode of polarized antenna operation to be used for transmitting signals to said access node.

13. The access node of claim 12, wherein said wireless terminal operates in a downlink mode of polarized antenna operation which is different from the uplink mode of antenna operation being signaled, the access node further comprising:
a transmission control module for controlling transmission using one of a first antenna and a second antenna, the antenna being used for signaling the mode of polarized antenna operation to be used, corresponding to the downlink mode of polarized antenna operation in which said wireless terminal is operating.

14. The access node of claim 10, further comprising:
a scheduling module including a first segment assignment module for assigning a first communications segment to be used by two wireless terminals at the same time, said assigning including selecting a first wireless terminal from the first set of wireless terminals and a second wireless terminal from the second set of wireless terminals.

15. The access node of claim 10, further comprising:
additional stored information in said memory, said additional stored information indicating assignment of a third set of wireless terminals, said third set of wireless terminals operating in a titled mode of antenna polarization operation; and
a scheduling module including a second segment assignment module for assigning a second communications segment to be used by a single wireless terminal, said second assignment module assigning a third wireless terminal from the third set of wireless terminals.

16. The access node of claim 15, wherein said scheduling module further includes a first assignment module for assigning a first communications segment to be used by two wireless terminals at the same time, said first assignment module selecting a first wireless terminal from the first set of wireless terminals and a second wireless terminal from the second set of wireless terminals to which said first segment are assigned.

17. The access node of claim 16,
wherein the first and second communications segments correspond to the same time; and
wherein said first and second communications segments are uplink traffic channel segments.

18. The access node of claim 16, further comprising:
a first information recovery module for recovering information from the first communications segment without use of signals from said second antenna; and
a second information recovery module for recovering information from the first communications segment without use of signals from the first antenna, said first and second antennas having said first and second polarizations respectively.

19. An access node, the access node comprising:
means for storing information indicating assignment of a first set of wireless terminals to a first polarized antenna mode of operation and assignment of a second set of wireless terminals to a second polarized antenna mode of operation which is different from the first polarized antenna mode of operation;
means for assigning wireless terminals to operate in one of said first and second polarized antenna modes of operation, said assigning for an individual one of said wireless terminals being based on a signal received from said individual one of the wireless terminals, the signal being one of: i) a pilot signal or ii) a channel quality information signal;

means for transmitting a signal to a wireless terminal indicating a mode of polarized antenna operation to be used;
wherein said access node is a base station; and
wherein said wireless terminal is a user device.

20. The access node of claim 19,
wherein said access node further includes:
a first antenna polarized in said vertical direction; and
a second antenna polarized in said horizontal direction.

21. The access node of claim 19, further comprising:
communications rate information generation means for generating communications rate information relating to communications between said wireless terminal and said base station; and
signal generation means for generating a rate information signal to be transmitted to said wireless terminal in addition to the mode of polarized antenna operation to be used.

22. A non-transitory computer readable medium embodying machine executable instructions for controlling a device to implement a method, the method comprising:
storing information indicating assignment of a first set of wireless terminals to a first polarized antenna mode of operation;
storing information indicating assignment of a second set of wireless terminals to a second polarized antenna mode of operation which is different from the first polarized antenna mode of operation;
assigning a wireless terminal to operate in one of said first and second polarized antenna modes of operation based on a signal received from said wireless terminal, the signal being one of: i) a pilot signal received from the wireless terminal or ii) a channel quality information signal received from the wireless terminal;
signaling to the wireless terminal, a mode of polarized antenna operation to be used;
wherein said access node is a base station; and
wherein said wireless terminal is a user device.

23. The non-transitory computer readable medium of claim 22,
wherein said first and second modes of polarized antenna operation are vertical and horizontal modes of antenna operation.

24. An apparatus for use in a device, the apparatus comprising:
a processor configured to control said device to:
assigning a first wireless terminal to operate in one of said first and second polarized antenna modes of operation based on a signal received from said first wireless terminal, the signal being one of: i) a pilot signal received from the wireless terminal or ii) a channel quality information signal received from the wireless terminal;
store information indicating assignment of a first set of wireless terminals to a first polarized antenna mode of operation;
store information indicating assignment of a second set of wireless terminals to a second polarized antenna mode of operation which is different from the first polarized antenna mode of operation;
signal to the wireless terminal, a mode of polarized antenna operation to be used;
wherein said access node is a base station; and
wherein said wireless terminal is a user device.

25. The apparatus of claim 24, wherein the processor is further configured to:
assign a first communications segment to be used by two wireless terminals at the same time, said assigning including selecting one wireless terminal from the first set of wireless terminals and one wireless terminal from the second set of wireless terminals.

26. The apparatus of claim 25,
wherein said first and second modes of polarized antenna operation are vertical and horizontal modes of antenna operation.

27. A method of operating a wireless terminal, the method comprising:
transmitting at least one of: i) a pilot signal; or ii) a channel quality information signal, to an access node;
receiving a signal from said access node indicating an assigned mode of polarized antenna operation to be used when communicating with said access node, said assigned mode being assigned by said access node based on the transmitted at least one pilot signal or channel quality information signal and being one mode from a set of possible modes of polarized antenna operation, said set of possible modes of polarized antenna operation including at least a horizontal polarization direction mode and a vertical polarization direction mode;
configuring the wireless terminal to said assigned mode of polarized antenna operation;
communicating with said access node while configured in said assigned mode of polarized antenna operation;
wherein said access node is a base station; and
wherein said wireless terminal is a user device.

28. The method of claim 27, further comprising:
storing information indicating the assigned mode of polarized antenna operation.

29. The method of claim 27, wherein said assigned mode of polarized antenna operation is one of: i) a first mode which is the vertical polarization direction mode or ii) a second mode which is the horizontal polarization direction mode.

30. The method of claim 27, further comprising:
receiving rate information corresponding to said assigned mode of polarized antenna operation.

31. The method of claim 27, wherein said assigned mode of polarized antenna operation to be used which is signaled to said wireless terminal is an uplink mode of polarized antenna operation to be used for transmitting signals to said access node.

32. The method of claim 31, wherein said wireless terminal operates in a downlink mode of polarized antenna operation which is different from the uplink mode of antenna operation being signaled, said receiving being performed using an antenna corresponding to the downlink mode of polarized antenna operation in which said wireless terminal is operating.

33. The method of claim 27, further comprising:
receiving a first communications segment assignment, wherein said first communications segment is to be used by two wireless terminals at the same time but with said two wireless terminals using different antenna polarizations, and wherein said first communications segment assignment indicates that said wireless terminal is one of said two wireless terminals.

34. The method of claim 33, wherein said set of possible modes of polarized antenna operation further includes a third mode which is a tilted mode of polarization operation and wherein said assigned mode of polarized antenna operation is one of the vertical polarization mode and the horizontal polarization mode, the method further comprising:
subsequent to receiving said first communications segment assignment, receiving a second mode assignment signal from said access node indicating that the assigned mode of polarized antenna operation to be used when communicating with said access node is said third mode;

configuring the wireless terminal to said assigned third mode of polarized antenna operation; and transmitting a signal to said access node while configured in said assigned third mode of polarized antenna operation.

35. The method of claim 34, further comprising:
storing information indicating the third mode of polarized antenna operation.

36. The method of claim 34, further comprising:
prior to transmitting a signal to said access node in said assigned third mode of polarized antenna operation:
receiving a second communications segment assignment, said second communications segment being used by a single wireless terminal and indicating that said wireless terminal is assigned the second communications segment; and
wherein transmitting a signal to said access node while configured in said assigned third mode of polarized antenna operation includes transmitting uplink signals in said second communications segment using both a vertical polarization antenna and a horizontal polarization antenna.

37. The method of claim 36, wherein said first and second communications segments are uplink traffic channel segments.

38. A non-transitory computer readable medium embodying machine executable instructions for controlling a wireless terminal to implement a method:
transmitting at least one of: i) a pilot signal; or ii) a channel quality information signal, to an access node;
receiving a signal from said access node indicating an assigned mode of polarized antenna operation to be used when communicating with said access node, said assigned mode being assigned by said access node based on the transmitted at least one pilot signal or channel quality information signal and being one mode from a set of possible modes of polarized antenna operation, said set of possible modes of polarized antenna operation including at least a horizontal polarization direction mode and a vertical polarization direction mode;
configuring the wireless terminal to said assigned mode of polarized antenna operation;
communicating with said access node while configured in said assigned mode of polarized antenna operation;
wherein said access node is a base station; and
wherein said wireless terminal is a user device.

39. The non-transitory computer readable medium of claim 38, wherein the method further comprises:
storing information indicating the assigned mode of polarized antenna operation.

40. An apparatus for use in a wireless terminal, the apparatus comprising:
a processor configured to control the wireless terminal to implement a method, the method comprising:
transmitting at least one of: i) a pilot signal; or ii) a channel quality information signal, to an access node;
receiving a signal from said access node indicating an assigned mode of polarized antenna operation to be used when communicating with said access node, said assigned mode being assigned by said access node based on the transmitted at least one pilot signal or channel quality information signal and being one mode from a set of possible modes of polarized antenna operation, said set of possible modes of polarized antenna operation including at least a horizontal polarization direction mode and a vertical polarization direction mode;
configuring the wireless terminal to said assigned mode of polarized antenna operation;
communicating with said access node while configured in said assigned mode of polarized antenna operation;
wherein said access node is a base station; and
wherein said wireless terminal is a user device.

41. The apparatus of claim 40, wherein the apparatus further comprises:
storing information indicating the assigned mode of polarized antenna operation.

* * * * *